(12) United States Patent  
Dalton et al.

(10) Patent No.: US 8,137,211 B2
(45) Date of Patent: *Mar. 20, 2012

(54) METHOD OF MAKING A GOLF BALL WITH A MULTI-LAYER CORE

(75) Inventors: Jeffery L. Dalton, Dartmouth, MA (US); Herbert C. Boehm, Norwell, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,492

(22) Filed: Sep. 28, 2009

(65) Prior Publication Data

US 2010/0016099 A1  Jan. 21, 2010

Related U.S. Application Data

(60) Continuation of application No. 11/508,180, filed on Aug. 23, 2006, now Pat. No. 7,594,866, which is a continuation of application No. 10/347,698, filed on Jan. 22, 2003, now Pat. No. 7,131,914, which is a division of application No. 09/948,692, filed on Sep. 10, 2001, now Pat. No. 7,014,573, which is a continuation-in-part of application No. 09/172,608, filed on Oct. 15, 1998, now Pat. No. 6,302,808, which is a division of application No. 08/943,932, filed on Oct. 3, 1997, now Pat. No. 6,056,842, said application No. 09/948,692 is a continuation-in-part of application No. 09/630,387, filed on Aug. 1, 2000, now Pat. No. 6,458,892, which is a continuation-in-part of application No. 08/603,057, filed on Feb. 16, 1996, now Pat. No. 5,759,676, and a continuation-in-part of application No. 08/996,718, filed on Dec. 23, 1997, now Pat. No. 6,124,389, which is a continuation-in-part of application No. 08/746,362, filed on Nov. 8, 1996, now Pat. No. 5,810,678, and a continuation-in-part of application No. 08/706,008, filed on Aug. 30, 1996, now Pat. No. 5,813,923, and a continuation-in-part of application No. 08/603,057, filed on Feb. 16, 1996, now Pat. No. 5,759,676, and a continuation-in-part of application No. 08/606,373, filed on Feb. 23, 1996, now Pat. No. 5,721,304.

(51) Int. Cl.
*A63B 37/04* (2006.01)
*A63B 37/08* (2006.01)
*A63B 37/12* (2006.01)

(52) U.S. Cl. .................. 473/370; 473/374; 473/377

(58) Field of Classification Search .......... 473/324–350
See application file for complete search history.

(56) References Cited

U.S. PATENT DOCUMENTS 696,368 A  2/1902  Kempshall ............... 156/146
(Continued)

FOREIGN PATENT DOCUMENTS

EP  0 637 459 A1  2/1995
(Continued)

OTHER PUBLICATIONS

Non-Final Office Action dated Mar. 3, 2010 of corresponding U.S. Appl. No. 11/642,766.
(Continued)

*Primary Examiner* — Alvin Hunter
(74) *Attorney, Agent, or Firm* — Murphy & King, P.C.

(57) ABSTRACT

A multilayer golf ball including a solid center having a center hardness, a plurality of laminates cut into a plurality of shapes formed around the center to create an inner ball, and a cover formed around the inner ball, wherein the plurality of layers can include at least a first layer having a hardness greater than the center hardness and a second layer having a hardness greater than the first layer hardness, and optionally a third layer disposed between the first and the second layers having a hardness greater than the first layer hardness.

20 Claims, 9 Drawing Sheets

U.S. PATENT DOCUMENTS

| | | | |
|---|---|---|---|
| 696,253 A | 3/1902 | Richards | 473/368 |
| 696,366 A | 3/1902 | Kempshall | 473/370 |
| 700,123 A | 5/1902 | Kempshall | 473/370 |
| 786,524 A | 4/1905 | Seiberling | 473/365 |
| 1,097,973 A | 5/1914 | Gordon | 473/598 |
| 1,240,438 A | 9/1917 | Griffiths | 156/245 |
| 1,524,171 A | 1/1925 | Chatfield | 473/373 |
| 1,870,862 A | 8/1932 | McKinnon | 473/364 |
| 2,181,350 A | 11/1939 | Smith | 273/62 |
| 2,363,086 A | 11/1944 | Ryan | 154/18 |
| 3,310,102 A | 3/1967 | Trombe | 165/133 |
| 3,359,231 A | 12/1967 | Kent | 524/493 |
| 3,490,146 A | 1/1970 | Guichet | 433/69 |
| 3,572,721 A | 3/1971 | Harrison | 273/218 |
| 3,572,722 A | 3/1971 | Harrison | 273/218 |
| 3,617,589 A | 11/1971 | Jones-Hinton et al. | 234/453 |
| 4,076,255 A | 2/1978 | Moore et al. | 237/226 |
| 4,090,716 A | 5/1978 | Martin et al. | 473/384 |
| 4,123,061 A | 10/1978 | Dusbiber | 437/377 |
| 4,234,184 A | 11/1980 | Deleens et al. | 473/378 |
| 4,272,079 A | 6/1981 | Nakade et al. | 273/225 |
| 4,274,637 A | 6/1981 | Molitor | 237/235 R |
| 4,321,183 A | 3/1982 | Cox et al. | 273/423 |
| 4,337,946 A | 7/1982 | Saito et al. | 273/235 |
| 4,337,947 A | 7/1982 | Saito et al. | 437/356 |
| 4,398,000 A | 8/1983 | Kataoka et al. | 525/437 |
| 4,431,193 A | 2/1984 | Nesbitt | 273/235 |
| 4,556,220 A | 12/1985 | Tominaga et al. | 273/218 |
| 4,561,657 A | 12/1985 | Tominaga et al. | 237/218 |
| 4,625,964 A | 12/1986 | Yamada | 273/62 |
| 4,650,193 A | 3/1987 | Molitor et al. | 273/228 |
| 4,696,475 A | 9/1987 | Tomita et al. | 273/227 |
| 4,714,253 A | 12/1987 | Nakahara et al. | 273/228 |
| 4,781,383 A | 11/1988 | Kamada et al. | 273/228 |
| 4,783,078 A | 11/1988 | Brown et al. | 273/216 |
| 4,848,770 A | 7/1989 | Shama | 273/228 |
| 4,858,923 A | 8/1989 | Gobush et al. | 273/62 |
| 4,863,167 A | 9/1989 | Matsuki et al. | 273/62 |
| 4,884,814 A | 12/1989 | Sullivan | 514/524 |
| 4,919,434 A | 4/1990 | Saito | 273/235 |
| 4,955,966 A | 9/1990 | Yuki et al. | 273/218 |
| 4,979,746 A | 12/1990 | Gentiluomo | 273/220 |
| 4,984,803 A | 1/1991 | Llort et al. | 273/235 R |
| 4,984,804 A | 1/1991 | Yamada et al. | 473/372 |
| 4,986,545 A | 1/1991 | Sullivan | 473/373 |
| 4,998,734 A | 3/1991 | Meyer | 273/235 R |
| 5,000,459 A | 3/1991 | Isaac | 473/356 |
| 5,002,281 A | 3/1991 | Nakahara et al. | 273/220 |
| 5,019,319 A | 5/1991 | Nakamura et al. | 273/218 |
| 5,026,067 A | 6/1991 | Gentiluomo | 273/220 |
| 5,037,104 A | 8/1991 | Watanabe et al. | 273/35 R |
| 5,048,838 A | 9/1991 | Chikaraishi et al. | 273/228 |
| 5,068,151 A | 11/1991 | Nakamura | 428/407 |
| 5,072,944 A | 12/1991 | Nakahara et al. | 273/220 |
| 5,096,201 A | 3/1992 | Egashira et al. | 273/218 |
| 5,104,126 A | 4/1992 | Gentiluomo | 273/228 |
| 5,120,791 A | 6/1992 | Sullivan | 525/196 |
| 5,123,659 A | 6/1992 | Williams | 273/60 B |
| 5,150,906 A | 9/1992 | Molitor et al. | 273/220 |
| 5,159,035 A | 10/1992 | Evani | 526/196 |
| 5,184,828 A | 2/1993 | Kim et al. | 273/228 |
| 5,209,485 A | 5/1993 | Nesbitt et al. | 273/218 |
| 5,222,739 A | 6/1993 | Horiuchi et al. | 473/356 |
| 5,253,871 A | 10/1993 | Viollaz | 273/228 |
| 5,298,571 A | 3/1994 | Statz et al. | 525/330 |
| 5,314,187 A | 5/1994 | Proudfit | 273/235 |
| 5,368,304 A | 11/1994 | Sullivan et al. | 273/220 |
| 5,387,637 A | 2/1995 | Sullivan | 437/377 |
| 5,415,937 A | 5/1995 | Cadorniga et al. | 428/407 |
| 5,439,227 A | 8/1995 | Egashira et al. | 273/228 |
| 5,467,994 A | 11/1995 | Moriyama et al. | 273/222 |
| 5,492,972 A | 2/1996 | Stefani | 525/196 |
| 5,553,852 A | 9/1996 | Higuchi et al. | 473/373 |
| 5,556,098 A | 9/1996 | Higuchi et al. | 473/373 |
| 5,580,057 A | 12/1996 | Sullivan et al. | 473/377 |
| 5,586,950 A | 12/1996 | Endo | 473/356 |
| 5,601,502 A | 2/1997 | Hiraoka et al. | 473/373 |
| 5,609,532 A | 3/1997 | Chikaraishi | 473/365 |
| 5,681,898 A | 10/1997 | Pocklington | 528/193 |
| 5,688,191 A | 11/1997 | Cavallaro et al. | 473/373 |
| 5,721,304 A | 2/1998 | Pasqua, Jr. | 524/433 |
| 5,730,665 A * | 3/1998 | Shimosaka et al. | 473/376 |
| 5,743,816 A | 4/1998 | Ohsumi et al. | 473/376 |
| 5,759,676 A | 6/1998 | Cavallaro et al. | 428/215 |
| 5,772,531 A | 6/1998 | Ohsumi et al. | 473/376 |
| 5,803,831 A | 9/1998 | Sullivan | 473/374 |
| 5,810,678 A | 9/1998 | Cavallaro | 473/373 |
| 5,813,923 A | 9/1998 | Cavallaro | 473/373 |
| 5,833,553 A | 11/1998 | Sullivan | 473/374 |
| 5,836,831 A | 11/1998 | Stanton et al. | 473/354 |
| 5,885,172 A | 3/1999 | Hebert et al. | 473/354 |
| 6,042,488 A | 3/2000 | Sullivan | 473/374 |
| 6,045,454 A | 4/2000 | Chu | 473/280 |
| 6,056,842 A | 5/2000 | Dalton | 156/243 |
| 6,068,561 A | 5/2000 | Renard et al. | 473/364 |
| 6,117,025 A | 9/2000 | Sullivan | 473/373 |
| 6,124,389 A | 9/2000 | Cavallaro | 524/432 |
| 6,207,784 B1 * | 3/2001 | Rajagopalan | 528/71 |
| 6,213,892 B1 | 4/2001 | Felker et al. | 473/370 |
| 6,290,614 B1 * | 9/2001 | Kennedy et al. | 473/378 |
| 6,299,550 B1 * | 10/2001 | Molitor et al. | 473/354 |
| 6,302,808 B1 * | 10/2001 | Dalton et al. | 473/371 |
| 6,394,914 B1 | 5/2002 | Sullivan | 473/376 |
| 6,425,833 B1 | 7/2002 | Sullivan et al. | 473/373 |
| 6,468,381 B1 | 10/2002 | Morgan | 156/244.19 |
| 7,407,450 B2 * | 8/2008 | Dalton et al. | 473/361 |
| 7,594,866 B2 * | 9/2009 | Dalton et al. | 473/370 |

FOREIGN PATENT DOCUMENTS

| | | |
|---|---|---|
| GB | 2260546 | 4/1993 |
| GB | 2267908 | 12/1993 |
| GB | 2278609 | 12/1994 |
| GB | 2299518 | 10/1996 |
| GB | 2300574 | 11/1996 |
| GB | 2302035 | 1/1997 |
| GB | 2302036 | 1/1997 |
| GB | 2302037 | 1/1997 |
| GB | 2311731 | 10/1997 |
| JP | 51-49840 | 4/1976 |
| JP | 63-212377 | 6/1985 |
| JP | 60-241463 | 11/1985 |
| JP | 64-80377 | 3/1989 |
| JP | 6-91019 | 4/1994 |
| JP | 142228 | 5/1994 |
| JP | 6-198005 | 7/1994 |
| WO | WO 96/40516 | 12/1996 |

OTHER PUBLICATIONS

Final Office Action dated Aug. 12, 2010 of corresponding U.S. Appl. No. 11/642,766.

* cited by examiner

METHOD OF MAKING A GOLF BALL WITH A MULTI-LAYER CORE

CROSS REFERENCE TO RELATED APPLICATIONS

This application is continuation of U.S. patent application Ser. No. 11/508,180, filed Aug. 23, 2006, now U.S. Pat. No. 7,594,866, which is a continuation of U.S. patent application Ser. No. 10/347,698, filed Jan. 22, 2003, now U.S. Pat. No. 7,131,914, which is a divisional of U.S. patent application Ser. No. 09/948,692, filed Sep. 10, 2001, now U.S. Pat. No. 7,014,573, which is a continuation-in-part of the U.S. patent application Ser. No. 09/172,608, filed Oct. 15, 1998, now U.S. Pat. No. 6,302,808, which is a divisional of U.S. patent application Ser. No. 08/943,932, filed Oct. 3, 1997, now U.S. Pat. No. 6,056,842, and also a continuation-in-part of U.S. patent application Ser. No. 09/630,387, filed Aug. 1, 2000, now U.S. Pat. No. 6,458,892, which is a continuation-in-part of U.S. patent application Ser. No. 08/603,057, filed Feb. 16, 1996, now U.S. Pat. No. 5,759,676, and a continuation-in-part of U.S. patent application Ser. No. 08/996,718, filed Dec. 23, 1997, now U.S. Pat. No. 6,124,389, which is a continuation-in-part of U.S. patent application Ser. No. 08/746,362, filed Nov. 8, 1996, now U.S. Pat. No. 5,810,678, U.S. patent application Ser. No. 08/706,008, filed Aug. 30, 1996, now U.S. Pat. No. 5,813,923, U.S. patent application Ser. No. 08/603,057, filed Feb. 16, 1996, now U.S. Pat. No. 5,759,676, and U.S. patent application Ser. No. 08/606,373, filed Feb. 23, 1996, now U.S. Pat. No. 5,721,304, the disclosures of which are hereby incorporated by reference in their entirety.

FIELD OF THE INVENTION

The present invention is directed to a method for making a multilayer golf ball including a solid center having a center hardness, a plurality of laminates cut into a plurality of shapes formed around the center to create an inner ball, and a cover formed around the inner ball, wherein the plurality layers can include at least a first layer having a hardness greater than the center hardness and a second layer having a hardness greater than the first layer hardness, and optionally a third intermediate layer disposed between the first and the second intermediate layers having a hardness greater than the first layer hardness. This invention also relates to a multilayer golf ball having a core, a cover and a plurality of intermediate layers disposed between the core and cover, wherein the intermediate layers are formed from thermoplastic or thermoset materials. The multilayer golf balls of the present invention have been found to provide the distance and durability characteristics approaching that of a conventional two piece ball while also providing the feel and "click" similar to that of a conventional wound golf ball.

BACKGROUND OF THE INVENTION

Golf ball manufacturers constantly strive to construct golf balls with a balance of good "feel," distance, and durability. Adjusting the construction of the ball, e.g., multilayer, and/or the composition of the individual layers, e.g., high flexural modulus material in an intermediate layer, allows golf ball manufacturers to tweak ball properties to obtain the desired balance of golf ball properties.

Golf balls today can be of varied construction, e.g., two piece balls, three piece balls, the latter including wound balls. The difference in play characteristics resulting from these different types of constructions can be quite significant.

Generally, golf balls have been classified as solid or wound balls. Solid balls having a two piece construction, typically an crosslinked rubber core, e.g., polybutadiene crosslinked with zinc diacrylate and/or similar crosslinking agents, encased by a blended cover, e.g., ionomer resins, are generally most popular with the average recreational golfer. The combination of the core and cover materials provide a "hard" ball that is virtually indestructible by golfers and one that imparts a high initial velocity to the ball, resulting in improved distance. Because the materials of which the ball is formed are very rigid, two piece balls have a hard "feel" when struck with a club. Likewise, due to their hardness, these balls have a relatively low spin rate which provides greater distance.

Wound balls are generally constructed from a liquid or solid center surrounded by tensioned elastomeric material and covered with a durable cover material, e.g., ionomer resin, or a softer cover material, e.g., balata or polyurethane. Wound balls are generally thought of as performance golf balls and have good resiliency, desirable spin characteristics, and feel when struck by a golf club. However, wound balls are generally difficult to manufacture when compared to solid golf balls.

The prior art includes a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens. A number of patents, for example, have been issued which are directed towards improving the carry distance of conventional two piece balls by altering the typical single layer core and single cover layer construction to provide a multi-layer ball, e.g., a dual cover layer, dual core layer, and/or a ball having an intermediate layer disposed between the cover and the core. U.S. Pat. Nos. 4,863,167, 5,184,828, and 4,714,253 are examples of such multilayer golf balls.

In addition, there are a number of patents directed to improving the spin, click and feel of solid balls while maintaining the distance provided by the solid construction golf balls. U.S. Pat. Nos. 5,072,944, 4,625,964, 4,650,193, and 4,848,770 disclose a golf ball having a rubber core and intermediate layer, e.g., polybutadiene, surrounded by a cover. U.S. Pat. Nos. 5,253,871, 5,681,898, 5,439,227, 5,556,098 are directed to golf balls having intermediate layers using a variety of materials other than polybutadiene.

Further, there are also several patents which are directed to golf balls having multiple cover layers. U.S. Pat. Nos. 4,431,193, 5,314,187, 4,919,434 are examples of such patents.

It would be advantageous to provide a golf ball having a core, a plurality of solid intermediate layers, and a cover, wherein the materials included in the intermediate layers are the same or different, resulting in a golf ball having improved physical properties.

SUMMARY OF THE INVENTION

The present invention is directed to an improved golf ball, including a core having a center and multiple layers, to improve the playing characteristics of the golf ball. The invention includes a golf ball having a core, wherein the core includes a center having a first hardness and a diameter of about 1 inch or less, and at least three layers surrounding the center having a thickness of about 0.1 inches or less, and a cover surrounding the core. The three layers and the center preferably include a thermoset rubber, e.g., polybutadiene rubber, each having a unique hardness different from the other core layers.

The present invention is also directed to a golf ball including a core, a cover, and at least one intermediate layer disposed between the core and the cover, wherein the intermediate layer is formed from a composition including at least one thermoplastic or thermoset polyurethane material, and wherein the golf ball has a compression of about 75 to about 85. In a preferred embodiment, the cover has a hardness of about 60 to about 72 Shore D.

In one embodiment, the intermediate layer has a hardness of between about 35 and 60 Shore D. In another embodiment, the cover hardness and the intermediate layer hardness have a first ratio from about 1.2 to about 2.1. In still another embodiment, the core has a hardness such that a second ratio of the intermediate layer hardness to the core hardness is about 0.64 to about 0.91. In a preferred embodiment, the core hardness is less than about 80 Shore C.

Preferably, the intermediate layer has a Shore D hardness of about 37 to about 45 and a flexural modulus of about 10,000 psi or greater. In one embodiment, the composition is solely thermoplastic polyurethane material. In another embodiment, the intermediate layer composition further includes an ethylene methacrylic/acrylic acid copolymer.

In another embodiment, the intermediate layer further includes additional thermoplastic material selected from the group consisting of polyesterester block copolymers, polyetherester block copolymers, polyetheramide block copolymers, ionomer resins, dynamically vulcanized thermoplastic elastomers, styrene-butadiene elastomers with functional groups such as maleic anhydride or sulfonic acid attached, thermoplastic polyesters, polymers formed using a metallocene catalyst, and mixtures thereof. Preferably, the thermoplastic or thermoset polyurethane material is present in an amount from about 25 to about 75 percent by weight.

In still another embodiment, the composition further includes a second thermoplastic or thermoset polyurethane.

Preferably, the intermediate layer has a thickness of about 0.125 inches or less. In another embodiment, the intermediate layer has a specific gravity of about 1.14 or greater. In a preferred embodiment, the intermediate layer has a specific gravity of greater than about 1.2.

In yet another embodiment, the composition further includes a density-adjusting filler. Preferably, the filler includes barium sulfate, zinc oxide, titanium dioxide, and mixtures thereof. If a filler is present, it preferably includes zinc oxide present in an amount from about 5 to about 40 weight percent.

In another embodiment, the core has a specific gravity of about 1 to about 1.2. In one embodiment, the core has a diameter of about 1.51 inches or less. In still another embodiment, the core has a Shore C hardness of about 80 or less. Preferably, the core includes a blend of polybutadiene and calcium oxide, and the at least one intermediate layer is formed of a composition including polyurethane material present in an amount of about 25 to about 75 weight percent, copolymer of ethylene and methacrylic acid present in an amount from about 10 to about 50 weight percent, and zinc oxide present in an amount from about 20 to about 30 weight percent. In one embodiment, the cover includes a blend of at least one ionomer.

The present invention is also directed to a golf ball including a core, a cover, and at least one intermediate layer disposed between the core and the cover, wherein the core has a hardness of less than about 80 Shore C; and the intermediate layer is formed from a blend including a thermoplastic polyurethane material, wherein the golf ball has a compression of about 75 to about 85, and wherein the intermediate layer has a hardness of between about 35 and about 50 Shore D. Preferably, the cover has a hardness of about 60 to about 72 Shore D.

In one embodiment, the core has a Bashore resilience of between about 30 to about 80. Preferably, the core resilience is between about 40 and about 70. In another embodiment, the intermediate layer has a Bashore resilience of between about 35 and about 75. Preferably, the intermediate layer resilience is between about 60 and about 70.

The present invention is also directed to a golf ball including a solid core, an intermediate layer, and a cover, wherein the solid core has a diameter of between about 1.25 and about 1.51 inches and a specific gravity of between about 1 and about 1.2, wherein the intermediate layer includes a polyurethane resin and has a hardness of between about 20 and about 60 Shore D and a specific gravity of greater than about 1.2 and greater than that of the solid core, and wherein the cover includes an ionomer resin and has a thickness about 0.04 inches or greater and a hardness of between about 60 and about 72 Shore D.

In one embodiment, the core diameter is between about 1.3 and about 1.48 inches. In another embodiment, the intermediate layer has a specific gravity of between about 1.21 and about 1.3. Preferably, the intermediate layer has a specific gravity of between about 1.23 and about 1.29. In another embodiment, the cover thickness is between about 0.04 and about 0.41 inches. In still another embodiment, the intermediate layer has a thickness of between about 0.02 and about 0.125 inches. In a preferred embodiment, the intermediate layer has a diameter of between about 1.27 and about 1.64 inches.

DETAILED DESCRIPTION OF THE INVENTION

The present invention is directed to multilayer golf balls having a core and a cover and at least one intermediate layer therebetween, resulting in excellent playing characteristics, e.g., resiliency, spin rates and feel. In particular, the present invention relates to golf balls having at least one of the following features: multiple core layers with an improved concentricity; intermediate layers formed from a thermoplastic or thermoset polyurethane; and a plurality of intermediate layers, wherein each intermediate layer is formed from a thermoplastic or thermoset materials.

Figure 1:
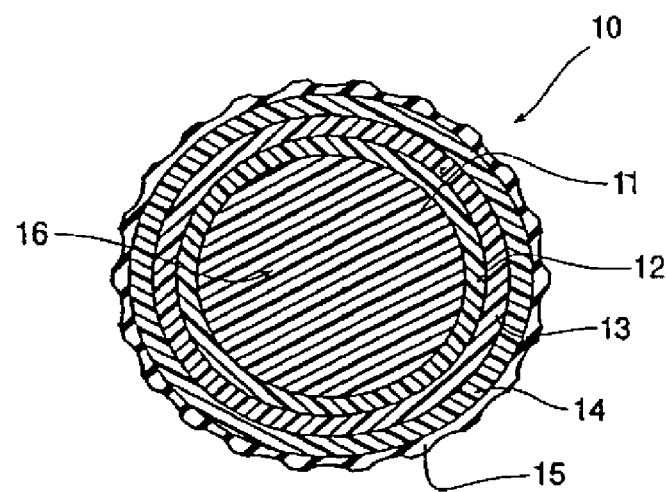
FIG. 1 is a cross-sectional view of a golf ball formed according to the present invention.

FIG. 1 shows a multilayer golf ball according to one embodiment of the present invention. Golf ball 10 includes a center 11, a first layer 12, a second layer 13, a third layer 14, and a cover 15. The first, second, and third layers may be of the same or different material. As used herein, the term "core layer" means any layer surrounding the center of the ball, but not the outermost layer, and, therefore, the term may be used interchangeably with the term "intermediate layer."

As used herein, the term "layer" includes any generally spherical portion of a golf ball or golf ball core, center, intermediate, or cover, including a one-piece ball. An "intermediate layer" is defined herein as a portion of the golf ball that occupies a volume between the cover and the core. Of course, as one of ordinary skill in the art would recognize, any of the core, cover, and intermediate of the golf balls of the invention can be formed of one layer or a plurality of layers, as that term is defined herein.

As used herein, the term "multilayer" means at least two layers and includes fluid-center balls, hollow-center balls, and balls with at least two intermediate layers and/or cover layers.

The following terms that are used in this application are defined in terms of the enumerated ASTM tests:

| | |
|---|---|
| Specific gravity | ASTM D - 297[1] |
| Flexural (Flex) Modulus | ASTM D - 6272-98, Procedure B |
| Shore C & D Hardness | ASTM D - 2240-00 |
| Melt flow index | ASTM Test D 1238, Condition E, Procedure A |

[1]Tests were carried out in lab conditions where temperature was controlled to 20-23EC. Humidity was not controlled.

The Center

The golf balls of the present invention are formed with a center having a low compression, but still exhibit a finished ball COR and initial velocity approaching that of conventional two-piece distance balls. Preferably, the center employed in the golf balls of the present invention have a compression of about 60 or less, more preferably about 45 to about 60 and most preferably about 50 to about 55. As used herein, the term "about," used in connection with one or more numbers or numerical ranges, should be understood to refer to all such numbers, including all numbers in a range. Likewise, it is preferred that the finished balls made with such centers have a COR, measured at an inbound speed of 125 ft./s., of about 0.795 to about 0.815, more preferably about 0.797 to about 0.812 and most preferably about 0.800 to about 0.810.

As used herein, "COR" refers to Coefficient of Restitution which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

In a preferred embodiment, the center has a Shore C hardness of about 65 to about 80, more preferably about 68 to about 75 and most preferably about 72 to about 75.

The centers employed in the golf balls of the present invention preferably have a diameter of about 1.25 inches to about 1.51 inches, more preferably about 1.30 inches to about 1.48 inches and most preferably about 1.39 inches. The overall diameter of the center and the intermediate layer is about 84 percent to about 97 percent of the overall diameter of the finished ball.

A representative base composition for forming the centers employed in the present invention includes polybutadiene and, in parts by weight based on 100 parts polybutadiene, 20 to 50 parts of a metal salt diacrylate, dimethacrylate, or monomethacrylate, preferably zinc diacrylate. The polybutadiene preferably has a cis-1,4 content of above about 90 percent and more preferably above about 96 percent. Commercial sources of polybutadiene include Shell 1220 manufactured by Shell Chemical, NEOCISC® BR40 manufactured by Enichem Elastomers, and UBEPOL® BR150 manufactured by Ube Industries, Ltd. If desired, the polybutadiene can also be mixed with other elastomers known in the art, such as natural rubber, styrene butadiene, and/or isoprene in order to further modify the properties of the center. When a mixture of elastomers is used, the amounts of other constituents in the center composition are usually based on 100 parts by weight of the total elastomer mixture.

Metal salt diacrylates, dimethacrylates, and monomethacrylates suitable for use in the center employed in this invention include those wherein the metal is magnesium, calcium, zinc, aluminum, sodium, lithium or nickel. Zinc diacrylate is preferred, because it provides golf balls with a high initial velocity in the United States Golf Association ("USGA") test. The zinc diacrylate can be of various grades of purity. For the purposes of this invention, the lower the quantity of zinc stearate present in the zinc diacrylate the higher the zinc diacrylate purity. Zinc diacrylate containing less than about 10 percent zinc stearate is preferable. More preferable is zinc diacrylate containing about 4 to about 8 percent zinc stearate. Suitable, commercially available zinc diacrylates include those from Rockland React-Rite and Sartomer. The preferred concentrations of zinc diacrylate that can be used are 20 to 50 parts per hundred (pph) based upon 100 pph of polybutadiene or alternately, polybutadiene with a mixture of other elastomers that equal 100 pph. As used herein, the term "pph" in connection with a batch formulation refers parts by weight of the constituent per hundred parts of the base composition.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide; 1,1-di(t-butylperoxy) 3,3,5-trimethyl cyclohexane; bis(t-butylperoxy)diisopropylbenzene; 2,5-dimethyl-2,5 di (t-butylperoxy)hexane; or di-t-butyl peroxide; and mixtures thereof. Other useful initiators would be readily apparent to one of ordinary skill in the art without any need for experimentation. The initiator(s) at 100 percent activity are preferably added in an amount ranging between about 0.05 and about 2.5 pph based upon 100 parts of butadiene, or butadiene mixed with one or more other elastomers. More preferably, the amount of initiator added ranges between about 0.15 and about 2 pph and most preferably between about 0.25 and about 1.5 pph.

Typical prior art golf ball centers incorporate 5 to 50 pph of zinc oxide (ZnO) in a zinc diacrylate-peroxide cure system that cross-links polybutadiene during the core molding process. However, in the present invention it is preferred that the ZnO in the center composition is eliminated in favor of calcium oxide (CaO). Centers produced from an admixture containing CaO have been found to exhibit desirable performance properties. In particular, when ZnO is replaced with CaO, it has been observed that the initial velocity and COR of the center is maintained, but the compression of the center is reduced by at least about 4 compression points on the standard compression scale, and may be reduced as much as 6 points.

As used herein, the terms "points" or "compression points" refer to the compression scale or the compression scale based on the ATTI Engineering Compression Tester. This scale, which is well known to those working in this field, is used in determining the relative compression of a center or ball. Some artisans use the Reihle compression scale instead of the standard compression scale. Based on disclosure in U.S. Pat. No. 5,368,304, column 20, lines 55-53 it appears that Reihle compression values can be converted to compression values through the use of the following equation:

compression value=160−Reihle compression value.

Additionally, the combination of the use of calcium oxide and a higher percentage of zinc diacrylate can be used to maintain the same compression as with the zinc oxide, but the initial velocity and COR is significantly increased. Thus, by using calcium oxide, either the center compression can be lowered and the initial velocity and COR maintained or the amount of zinc diacrylate can be increased so that the center compression is the same and the initial velocity and COR is increased.

The amount of calcium oxide added to the center-forming composition may be from about 0.1 to about 15, preferably 1 to 10, most preferably 1.25 to 5, parts calcium oxide per hundred parts of polybutadiene.

The center compositions employed in the present invention may also include fillers, added to the elastomeric composition to adjust the density and/or specific gravity of the center. As used herein, the term "fillers" includes any compound or composition that can be used to vary the density and other properties of the subject golf ball center. Fillers useful in the golf ball center according to the present invention include, for example, zinc oxide (in an amount significantly less than that which would be necessary without the addition of the calcium oxide), barium sulfate, and regrind (which is recycled core molding matrix ground to 30 mesh particle size). The amount and type of filler utilized is governed by the amount and weight of other ingredients in the composition, since a maximum golf ball weight of 1.620 oz has been established by the USGA. Appropriate fillers generally used range in specific gravity from about 2.0 to about 5.6. In the preferred golf ball, the amount of filler in the center is lower than that of a typical golf ball such that the specific gravity of the center is decreased.

The preferred range of specific gravities of the centers employed in the present invention is from about 1.0 to about 1.2, more preferably in the range of about 1.1 to about 1.18, depending upon the size of the center, cover, intermediate layer and finished ball, as well as the specific gravity of the cover and intermediate layer.

Other ingredients such as accelerators, e.g. tetra methylthiuram, processing aids, processing oils, plasticizers, dyes and pigments, antioxidants, as well as other additives well known to the skilled artisan may also be used in the present invention in amounts sufficient to achieve the purpose for which they are typically used.

The Intermediate Layer(s)

The intermediate layer(s) may be formed from dynamically vulcanized thermoplastic elastomers, functionalized styrene-butadiene elastomers, thermoplastic rubbers, thermoset elastomers, thermoplastic urethanes, metallocene polymers, thermoset urethanes, ionomer resins, or blends thereof. In a preferred embodiment of the present invention, the intermediate layer includes a thermoplastic or thermoset polyurethane.

Suitable dynamically vulcanized thermoplastic elastomers include SANTOPRENE®, SARLINK®, VYRAM®, DYTRON® and VISTAFLEX®. SANTOPRENE® is the trademark for a dynamically vulcanized PP/EPDM. SANTOPRENE® 203-40 is an example of a preferred SANTOPRENE® and is commercially available from Advanced Elastomer Systems.

Examples of suitable functionalized styrene-butadiene elastomers, i.e., styrene-butadiene elastomers with functional groups such as maleic anhydride or sulfonic acid, include KRATON FG-1901x and FG-1921x, which are available from the Shell Corporation of Houston, Tex.

Examples of suitable thermoplastic polyurethanes include ESTANE® 58133, ESTANE®58134 and ESTANE®58144, which are commercially available from the B.F. Goodrich Company of Cleveland, Ohio.

Suitable metallocene polymers, i.e., polymers formed with a metallocene catalyst include those commercially available from Sentinel Products of Hyannis, Mass. Suitable thermoplastic polyesters include polybutylene terephthalate.

Suitable thermoplastic ionomer resins are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, low modulus ionomers such as acid-containing ethylene copolymer ionomers, include E/X/Y copolymers where E is ethylene, X is a softening comonomer such as acrylate or methacrylate present in 0-50 (preferably 0-25, most preferably 0-2), weight percent of the polymer, and Y is acrylic or methacrylic acid present in 5-35 (preferably 10-35, most preferably 15-35, making the ionomer a high acid ionomer) weight percent of the polymer, wherein the acid moiety is neutralized 1-90 percent (preferably at least 40 percent, most preferably at least about 60 percent) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Such ionomer resins include SURLYN® and Iotek®, which are commercially available from DuPont and Exxon, respectively.

In another preferred embodiment of the present invention, the intermediate layer is a blend of a first and a second component wherein the first component is a dynamically vulcanized thermoplastic elastomer, a functionalized styrene-butadiene elastomer, a thermoplastic or thermoset polyurethane or a metallocene polymer and the second component is a material such as a thermoplastic or thermoset polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof. In a more preferred embodiment, at least one of the first and second components includes a thermoplastic or thermo set polyurethane.

Such thermoplastic blends useful in the intermediate layers of the golf ball of the present invention preferably include about 1 percent to about 99 percent by weight of a first thermoplastic and about 99 percent to about 1 percent by weight of a second thermoplastic. Preferably the thermoplastic blend includes about 5 percent to about 95 percent by weight of a first thermoplastic and about 5 percent to about 95 percent by weight of a second thermoplastic. In a preferred embodiment of the present invention, the first thermoplastic material of the blend is a dynamically vulcanized thermoplastic elastomer, such as Santoprene®.

The intermediate layer of the present invention may be formed from an intermediate layer blend including up to 100 percent by weight of an ethylene methacrylic/acrylic acid copolymer. As used herein, the term "copolymer" refers to a polymer which is formed from two or more monomers. Below is a non-limiting example of the chemical structure for suitable ethylene methacrylic/acrylic acid

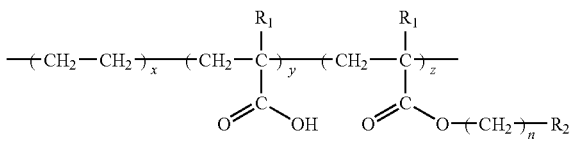

copolymers:
wherein
  x=50 to 99 percent;
  y=1 to 50 percent;
  z=0 to 49 percent;
  $R_1$=H or $CH_3$; $R_2$=$CH_3$ or isobornyl; and
  n=0 to 12.

Specific acid-containing ethylene copolymers include ethylene/acrylic acid; ethylene/methacrylic acid; ethylene/acrylic acid/n- or isobutyl acrylate; ethylene/methacrylic acid/n- or iso-butyl acrylate; ethylene/acrylic acid/methyl acrylate; ethylene/methacrylic acid/methyl acrylate; ethylene/acrylic acid/iso-bornyl acrylate or methacrylate and ethylene/methacrylic acid/isobornyl acrylate or methacrylate. Suitable ethylene methacrylic/acrylic acid copolymers are sold commercially by DuPont under the tradename NUCREL®, with NUCREL®960, NUCREL®RX9-1, and 010 being preferred.

In one embodiment, the intermediate layer is formed from a blend which includes an ethylene methacrylic/acrylic acid copolymer.

In another embodiment of the present invention, the intermediate layer is formed from a blend which includes an ethylene methacrylic/acrylic acid copolymer and a second component which includes a thermoplastic material. Suitable thermoplastic materials for use in the intermediate blend include, but are not limited to, polyesterester block copolymers, polyetherester block copolymers, polyetheramide block copolymers, ionomer resins, dynamically vulcanized thermoplastic elastomers, styrene-butadiene elastomers with functional groups such as maleic anhydride or sulfonic acid attached, thermoplastic polyurethanes, thermoplastic polyesters, polymers formed using a metallocene catalyst ("metallocene polymers") and/or blends thereof.

Suitable thermoplastic polyetheresters include materials which are commercially available from DuPont under the tradename HYTREL® and include HYTREL® 3078, HYTREL® G3548W and HYTREL® G4078W.

Suitable thermoplastic polyetheramides are commercially available from Elf-Atochem of Philadelphia, Pa., under the tradename PEBAX® and include PEBAX® 2533, PEBAX® 1205 and PEBAX® 4033.

Preferably, the second component of the intermediate layer blend includes polyetherester block copolymer, with HYTREL®3078 being a particularly preferred polyetherester block copolymer.

Other conventional materials, such as balata, elastomer and polyethylene may also be used in the first, second and third layers 12, 13 and 14 of the present invention.

Many prior art intermediate layers generally have a specific gravity of about 1 or less. However, in a preferred embodiment, the intermediate layer employed in the golf balls of the present invention have a specific gravity greater than 1.2, preferably about 1.21 to about 1.30, more preferably about 1.23 to about 1.29 and most preferably about 1.27.

The desired specific gravity of the intermediate layer may be obtained by adding a filler such as barium sulfate, zinc oxide, titanium dioxide and combinations thereof to the intermediate layer blend. Zinc oxide is the preferred filler.

In one embodiment of the present invention, the intermediate layer is formed from a blend of about 1 to about 99 percent by weight ethylene methacrylic/acrylic acid copolymer, about 0 to about 75 percent by weight of the second thermoplastic component (as described above) and about 0 to about 50 percent by weight zinc oxide. In another embodiment of the present invention, the intermediate layer is formed from a blend of about 10 to 50 percent by weight ethylene methacrylic/acrylic acid copolymer, 25 to 75 percent by weight of a second thermoplastic component and about 5 to about 40 percent by weight zinc oxide. In a most preferred embodiment of the present invention, the intermediate layer is formed from a blend of about 15 to about 25 percent by weight ethylene methacrylic/acrylic acid copolymer, about 50 to about 60 percent by weight of a second thermoplastic component and about 20 to about 30 percent by weight zinc oxide. In another embodiment of the invention, the second thermoplastic component is present in the intermediate layer blend in an amount of less than 50 percent by weight, and preferably 30 to 45 percent by weight. A specific example of this embodiment is an intermediate layer composition including about 57 percent by weight HYTREL®

3078, about 20 percent by weight NUCREL® 960, and about 23 percent by weight zinc oxide.

The intermediate layer blend preferably has a flexural modulus of less than about 10,000 psi, more preferably about 5,000 to about 8,000 psi and most preferably about 7,500 psi. Likewise, the intermediate layers employed in the golf balls of the present invention preferably have a Shore D hardness of about 35 to 50, more preferably about 37 to about 45 and most preferably about 40.

Preferably, the intermediate layer and core construction employed in the present invention have a compression of less than about 65, more preferably about 50 to about 65, and most preferably about 50 to 55.

The intermediate layer employed in the golf balls of the present invention preferably have a thickness from about 0.020 inches to about 0.125 inches, more preferably about 0.035 inches to about 0.085 inches and most preferably about 0.06 inches The outer diameter of the intermediate layer is preferably about 1.510 inches.

The golf balls of the present invention may include a plurality of intermediate layers, e.g., a first intermediate layer adjacent the core and a second intermediate layer adjacent the cover. The first intermediate layer may include the materials as discussed above. Preferably, the first intermediate layer includes a thermoplastic material and has a greater hardness than the core. The second intermediate layer may be disposed around the first intermediate layer and preferably has a greater hardness than the first intermediate layer.

The second intermediate layer may be formed of materials such as polyether or polyester thermoplastic urethanes, thermoset urethanes, and ionomers such as acid-containing ethylene copolymer ionomers, including E/X/Y terpolymers where E is ethylene, X is an acrylate or methacrylate-based softening comonomer present in 0 to 50 weight percent and Y is acrylic or methacrylic acid present in 5 to 35 weight percent. More preferably, in a low spin rate embodiment designed for maximum distance, the acrylic or methacrylic acid is present in 15 to 35 weight percent, making the ionomer a high modulus ionomer.

In one embodiment, the second intermediate layer is formed of composition including at least one high acid ionomer. As used herein, the term "high acid ionomer", is an ionomer resin wherein Y is acrylic or methacrylic acid units present from about 17 weight percent to about 35 weight percent in the polymer. Generally, a high acid ionomer will have a Shore D hardness of about 60 or greater and a flexural modulus of about 50,000 psi or greater, preferably from about 50,000 psi to about 125,000 psi. In the vernacular of the golf ball art, high acid ionomers are sometimes referred to as "hard" ionomers.

In another embodiment, the second intermediate layer is preferably formed of a thermoset material, preferably having a flexural modulus of about 50,000 psi or greater. In one embodiment, the thermoset material is polybutadiene.

In one embodiment, the second intermediate layer is adjacent the cover and has a hardness greater than that of the first intermediate layer.

A third intermediate layer may be disposed in between the first and second intermediate layers. The third intermediate layer may be formed of the variety of materials as discussed above. In one embodiment, the third intermediate layer is disposed in between the first and second intermediate layers and preferably has a hardness greater than the hardness of the first intermediate layer.

The Cover Layer

The cover layer of the present invention may include at least one layer of a thermoplastic or thermosetting material.

Any number of a wide variety of cover materials may be used in the present invention such as ionomer resins, polyurethanes, balata and blends thereof.

In one embodiment, the cover is formed of a composition including very low modulus ionomers (VLMIs). As used herein, the term "very low modulus ionomers", or the acronym "VLMIs", are those ionomer resins further including a softening comonomer X, commonly a (meth)acrylate ester, present from about 10 weight percent to about 50 weight percent in the polymer. VLMIs are copolymers of an α-olefin, such as ethylene, a softening agent, such as n-butyl-acrylate or iso-butyl-acrylate, and an α,β-unsaturated carboxylic acid, such as acrylic or methacrylic acid, where at least part of the acid groups are neutralized by a magnesium cation. Other examples of softening comonomers include n-butyl methacrylate, methyl acrylate, and methyl methacrylate. Generally, a VLMI will have a flexural modulus from about 2,000 psi to about 10,000 psi. VLMIs are sometimes referred to as "soft" ionomers. U.S. Pat. No. 6,144,415, which is incorporated in its entirety by reference herein, discloses suitable VLMIs for incorporation into the cover formulations of the present invention.

Ionomers, such as acid-containing ethylene copolymer ionomers, include E/X/Y copolymers where E is ethylene, X is a softening comonomer such as acrylate or methacrylate present in 0 to 50 (preferably 0 to 25, most preferably 0 to 2), weight percent of the polymer, and Y is acrylic or methacrylic acid present in 5 to 35 (preferably 10 to 35, most preferably 15 to 20) weight percent of the polymer, wherein the acid moiety is neutralized 1 to 90 percent (preferably at least 40 percent, most preferably at least about 60 percent) to form an ionomer by a cation such as lithium, sodium, potassium, magnesium, calcium, barium, lead, tin, zinc or aluminum, or a combination of such cations, lithium, sodium and zinc being the most preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

As mentioned above, ionomer resins are commercially available from E.I. DuPont de Nemours and Co. of Wilmington, Del., under the tradename SURLYN®, and from Exxon Corporation of Houston, Tex., under the tradename IOTEK®. Some particularly suitable SURLYNS® include SURLYN® 8140 (Na) and SURLYN® 8546 (Li) which have an methacrylic acid content of about 19 percent.

To aid in the processing of the cover stock, and as is well known in the art, ionomer resins may be blended in order to obtain a cover having desired characteristics. For this reason, it is preferable that the covers of the golf balls of the present invention be formed from a blend of two or more ionomer resins. A particularly preferred cover material for use in the present invention is formed from a blend of about 50 percent by weight SURLYN® 7940, about 47 percent by weight SURLYN® 8940 and about 3 percent by weight SURLYN® 8660.

In one embodiment, the cover material includes a blend of a very soft material and a harder material. Preferably, the cover includes about 75 to about 25 parts by weight based on 100 parts by weight resin (pph) of a VLMI and about 25 pph to about 75 pph of a standard ionomer resin. Preferably, the VLMI is a sodium ionomer resin and constitutes about 40 pph to about 60 pph of the ionomer blend and the standard ionomer resin is a lithium ionomer resin and constitutes about 60 pph to about 40 pph of the ionomer blend. Even more preferably, a 50/50 blend of the sodium and lithium ionomers with additives, e.g., color concentrate, is used for the cover composition. Suitable sodium ionomer resins include, but are not limited to SURLYN® 8320, SURLYN® 8269, and SURLYN® 8265.

The sodium ionomer resin is preferably a copolymer including about 95 to about 80 parts by weight of copolymer of ethylene and about 5 to about 12 parts by weight of the copolymer of acrylic or methacrylic acid in which about 10 percent to about 90 percent of the acid groups are neutralized by sodium. In one embodiment, the sodium ionomer resin used in the present invention has a flexural modulus between about 1,000 and about 20,000 psi (5 and 140 MPa) and, more preferably, between about 2,000 and about 10,000 psi (10 to 70 MPa).

The lithium ionomer resin is preferably a copolymer including about 95 to about 80 parts by weight of ethylene and about 10 to about 16 parts by weight of acrylic or methacrylic acid based on 100 parts by weight copolymer. Preferably, the lithium ionomer resin has about 10 percent to about 90 percent of the acid groups neutralized by lithium. Preferably, the lithium ionomer resin has a high flexural modulus which is above about 60,000 psi (415 MPa). More preferably, the lithium ionomer resin used in the present invention has a flexural modulus between about 60,000 and about 80,000 psi (415 and 550 MPa). Good results have been obtained with the lithium ionomer resins having flexural moduli in the range of about 60,000 psi to about 70,000 psi (415 to 485 MPa), e.g., SURLYN® 8118, SURLYN® 7930 and SURLYN® 7940.

Both the lithium and sodium ionomer resins preferably have about 10 percent to about 90 percent of their carboxylic acid groups neutralized by their respective metal ions. More preferably, both the lithium and sodium ionomer resins have their carboxylic acid groups neutralized about 35 percent to about 65 percent by the metal ion. Preferably, the VLMI and harder ionomer resins include the same monocarboxylic acid, e.g. either methacrylic or acrylic acid.

In order to adjust the characteristics of the cover stock, other ionomer resins besides sodium and lithium can be employed.

SURLYN® 8320, SURLYN® 8269 and SURLYN® 8265 have flexural moduli of 2,800 psi (20 MPa), 2,800 psi (20 MPa) and 7,100 psi (50 MPa), respectively. SURLYN® 8118, 7930 and 7940 have flexural moduli of 61,000 psi (420 MPa), 67,000 psi (460 MPa) and 61,000 psi (420 MPa) respectively.

Conventionally, ionomer resins with different melt flow indexes are employed to obtain the desired characteristics of the cover stock. SURLYN® 8118, 7930 and 7940 have melt flow indices of about 1.4, 1.8, and 2.6 g/10 min., respectively. SURLYN® 8269 and SURLYN® 8265 both have a melt flow index of about 0.9 g/10 min. Preferably, the blend of ionomer resins used to make a cover of a golf ball in accordance with the present invention has a melt flow index between about 1 to about 4 g/10 min. and, more preferably, about 1 to about 3 g/10 min.

The combined amount of lithium ionomer resin and sodium ionomer resin used to make a cover in accordance with this embodiment of the present invention as described generally makes up at least about 90 percent by weight of the total weight of the golf ball cover and, preferably, at least about 95 percent by weight. Additional materials which may be included in the golf ball cover are other SURLYN® resins; whitening agents such as titanium dioxide; dyes; UV absorbers; optical brighteners; and other additives which are conventionally included in golf ball covers.

In another embodiment, the cover composition includes at least two ionomer resins, preferably sodium ionomer resin and lithium ionomer resin, having similar flexural moduli. Preferably, the sodium ionomer resin is a copolymer including about 95 to about 80 parts by weight of copolymer of ethylene and about 12 to about 20 parts by weight of the copolymer of acrylic or methacrylic acid in which about 10 percent to about 90 percent of the acid groups are neutralized by sodium.

Preferably, the lithium ionomer resin is a copolymer including about 95 to about 80 parts by weight of ethylene and about 12 to about 20 parts by weight of acrylic or methacrylic acid based on 100 parts by weight copolymer. Preferably, the lithium ionomer resin has about 10 percent to about 90 percent of the acid groups neutralized by lithium.

Preferably, the sodium ionomer resin used in the present invention has a flexural modulus between about 60,000 and about 80,000 psi (415 and 550 MPa).

The lithium ionomer resin used in the present invention has a flexural modulus between about 60,000 and about 80,000 psi (415 and 550 MPa). Good results have been obtained with the sodium and lithium ionomer resins having flexural moduli in the range of about 60,000 psi to about 70,000 psi (415 to 485 MPa).

Preferably, the ionomer resins incorporate the same monocarboxylic acid, e.g., either methacrylic or acrylic acid.

Sodium ionomer resin sold by DuPont under the name SURLYN® 8920 has worked well in the present invention. Good results have also been obtained with a lithium ionomer resin sold under the trade name SURLYN® 7940 by DuPont.

The cover layer employed in the present invention preferably have a Shore D hardness of about 60 to about 72, more preferably about 65 to about 70 and most preferably about 68 to about 70.

Castable reactive liquid materials are particularly preferred for the cover layers of the balls of the present invention. As used herein, the term "castable reactive liquid material" may refer to thermoset or thermoplastic materials. In a preferred embodiment, the castable reactive liquid material is a thermoset material.

In one embodiment, the castable reactive liquid material is cast urethane or polyurethane. Polyurethane is a product of a reaction between a polyurethane prepolymer and a curing agent. The polyurethane prepolymer is a product formed by a reaction between a polyol and a diisocyanate. Often a catalyst is employed to promote the reaction between the curing agent and the polyurethane prepolymer. In the case of cast polyurethanes, the curing agent is typically either a diamine or glycol.

In another preferred embodiment, the castable reactive liquid material is a thermoset cast polyurethane. Thermoset cast polyurethanes are generally prepared using a diisocyanate, such as 2,4-toluene diisocyanate (TDI), methylenebis-(4-cyclohexyl isocyanate) (HMDI), or para-phenylene diisocyanate ("PPDI") and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine. However, any suitable cast or non-cast thermoset polyurethane may be employed to from outer cover layers of the present invention.

Other suitable thermoset materials contemplated for the cover layers include, but are not limited to, thermoset urethane ionomers and thermoset urethane epoxies. Examples of suitable thermoset polyurethane ionomers are disclosed in U.S. Pat. Nos. 5,334,673 and 5,692,974, which are incorporated in their entirety by reference herein. Other examples of thermoset materials include polybutadiene, natural rubber, polyisoprene, styrene-butadiene, or styrene-propylene-diene rubber, which are particularly suitable when used in an intermediate layer of a golf ball.

When the cover includes more than one layer, e.g., an inner cover layer and an outer cover layer, various constructions and materials are suitable. For example, as disclosed in U.S. Pat. Nos. 5,803,831 and 6,210,293, which are incorporated in their entirety by reference herein, an inner cover layer may surround the intermediate layer with an outer cover layer disposed thereon or an inner cover layer may surround a plurality of intermediate layers.

When using an inner and outer cover layer construction, the outer cover layer material is preferably a thermoset material that includes at least one of a castable reactive liquid material and reaction products thereof, as described above, and preferably has a hardness from about 30 Shore D to about 60 Shore D. In one embodiment, the outer cover layer is thin, preferably less than about 0.05 inches, and more preferably from about 0.02 inches to about 0.045 inches.

The inner cover layer may be formed from a wide variety of hard (about 65 Shore D or greater, preferably from about 69 Shore D to about 74 Shore D), high flexural modulus resilient materials, which are compatible with the other materials used in the adjacent layers of the golf ball. The inner cover layer materials preferably has a flexural modulus of about 65,000 psi or greater. In one embodiment, the flexural modulus of the inner cover layer material is from about 70,000 psi to about 120,000 psi.

Suitable inner cover layer materials include the hard, high flexural modulus ionomer resins and blends thereof as disclosed in U.S. Pat. No. 5,885,172, which is incorporated in its entirety by reference herein. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0-50 (preferably 0-25, most preferably 0-20), weight percent of the polymer, and Y is acrylic or methacrylic acid present in 5-35 (preferably at least about 16, more preferably at least about 16-35, most preferably at least about 16-20) weight percent of the polymer, wherein the acid moiety is neutralized 1-90 percent (preferably at least 40 percent, most preferably at least about 60 percent) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Examples of other suitable inner cover materials include thermoplastic or thermoset polyurethanes, polyetheresters, polyetheramides, or polyesters, dynamically vulcanized elastomers, functionalized styrene-butadiene elastomers, metallocene polymers, polyamides such as nylons, acrylonitrile butadiene-styrene copolymers (ABS), or blends thereof. Suitable thermoplastic polyetheresters include materials which are commercially available from DuPont under the tradename Hytrel®. Suitable thermoplastic polyetheramides include materials which are available from Elf-Atochem under the tradename Pebax®.

The multi-layer golf ball of the invention can have an overall diameter of any size. Although the United States Golf Association specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention have an overall maximum compression of about 85, preferably about 75 to about 85, more preferably about 80 to about 85 and most preferably about 82.

Golf Ball Assembly

The center 11, as shown in FIG. 1, is preferably formed by compression molding a sphere from a prep of center material. Compression molding solid centers is well known in the art.

Figure 2:
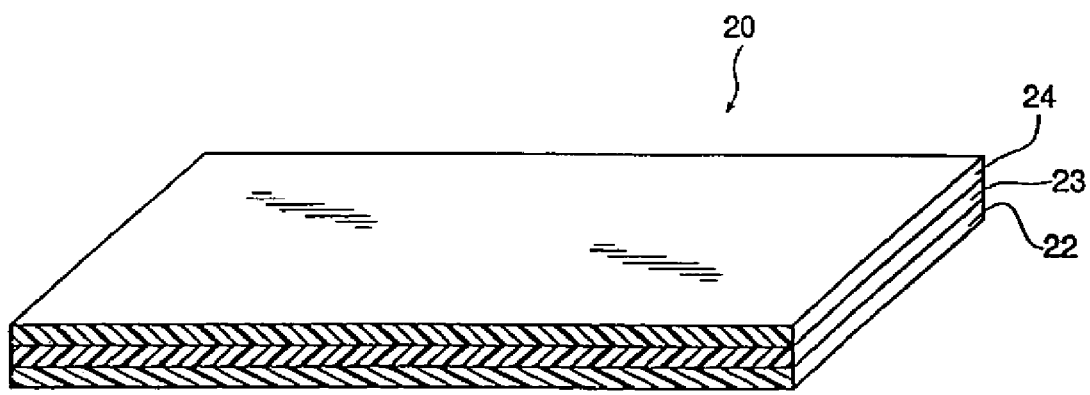
FIG. 2 is a perspective view of a laminate including three layers of core material.
Figure 3:
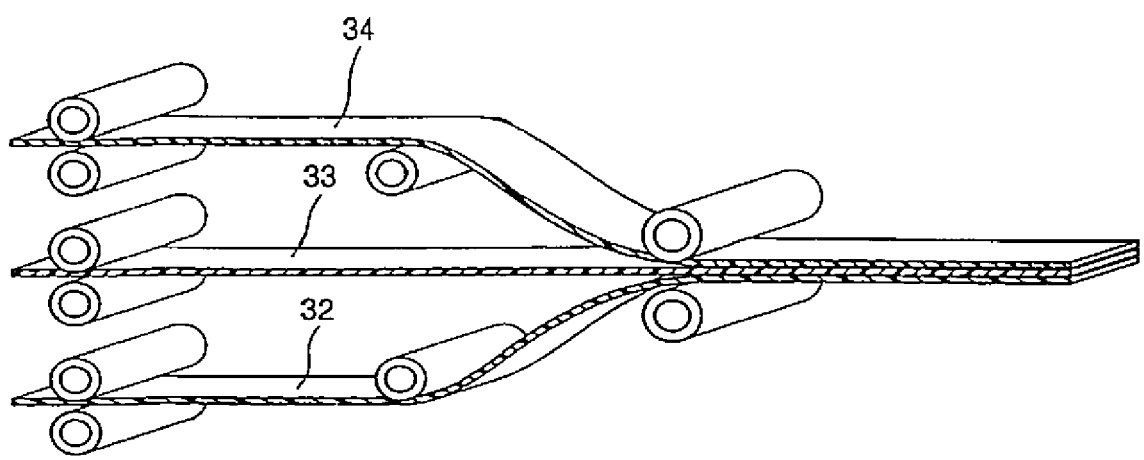
FIG. 3 is a sectional view of rollers and material being formed into the laminate of core material.

In one embodiment, the golf ball of the present invention may be formed with a laminate process, as shown in FIGS. 2 and 3. In order to form multiple layers around the center according to this embodiment of the invention, a laminate 20 is first formed. The laminate 20 includes at least two layers and, preferably, three layers 22, 23, 24. In one embodiment, the laminate is formed by mixing uncured core material to be used for each layer and calendar rolling the material into thin sheets 32, 33, 34. In another embodiment, the laminate is formed by mixing uncured intermediate layer material and rolling the material into sheets 32, 33, 34. The laminate sheets 32, 33, 34 are stacked together to form the laminate 20 having three layers 22, 23, 24 using calendar rolling mills. In another embodiment, however, the sheets 32, 33, 34 are made by extrusion.

In an alternate embodiment, the laminate 20 can be further constructed using an adhesive between each layer of material. Preferably, an epoxy resin such as Epoxy Resin #1028 from RBC Industries in Warwick, R.I. is used. The adhesive should have good shear and tensile strength and, preferably the adhesive should have a tensile strength over about 1500 psi. Still further, the adhesive should not become brittle when cured. An adhesive having a Shore D hardness of less than 60 when cured is preferred. The adhesive layer applied to the sheets should be very thin and preferably, less than 0.004 inches thick.

Preferably, each laminate sheet is formed to a thickness that is slightly larger than the thickness of the layers 12, 13, 14 in the finished golf ball 10. Each of these thicknesses can be varied, but all have a thickness of preferably less than about 0.1 inches. Preferably, the sheets are formed to thicknesses that are less than 0.05 inches and the laminate thickness is less than 0.15 inches. The sheets 32, 33 and 34 should have very uniform thicknesses, i.e., the thickness of each sheet should not vary more than about 0.005 inches.

Figure 4:
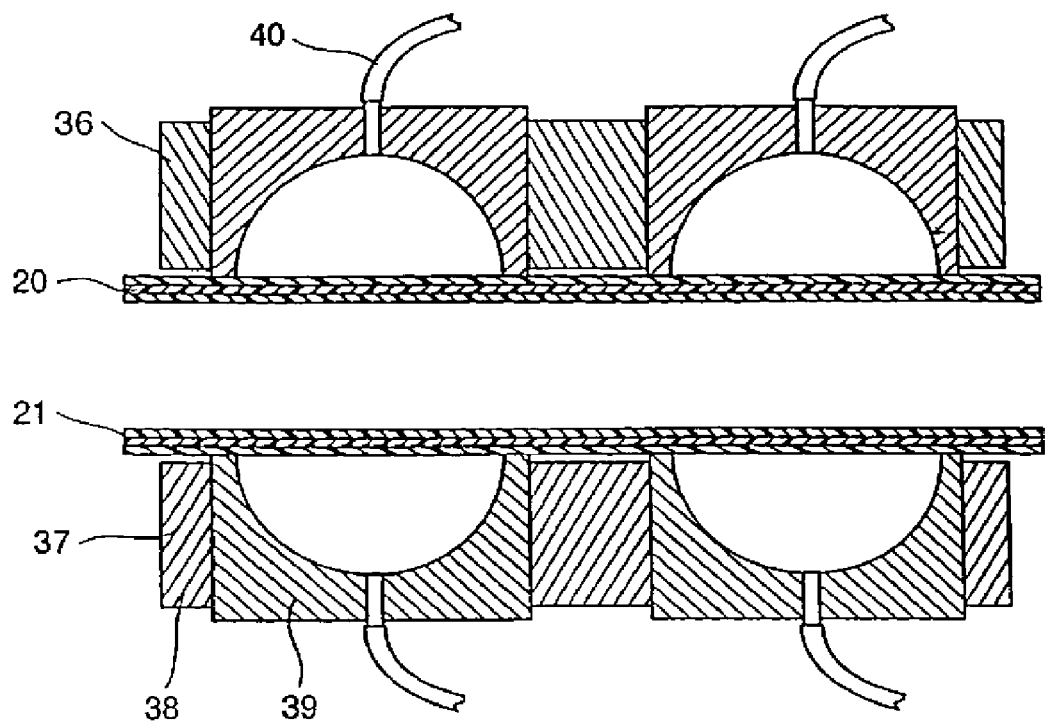
FIG. 4 is a sectional view of a mold for forming multiple layers about a core center according to the present invention.

The next step in the method, as shown in FIGS. 4-7, is to form multiple layers around the center. This is preferably accomplished by placing two laminates 20, 21 in between a top mold 36 and a bottom mold 37, as illustrated in FIG. 4. The molds 36, 37 are formed of mold frames 38 and replaceable mold halves 39 such as that described in U.S. Pat. No. 4,508,309 to Brown, the disclosure of which is incorporate in its entirety by reference herein. The laminates 20, 21 are formed to the cavities in the mold halves 39.

Figure 5:
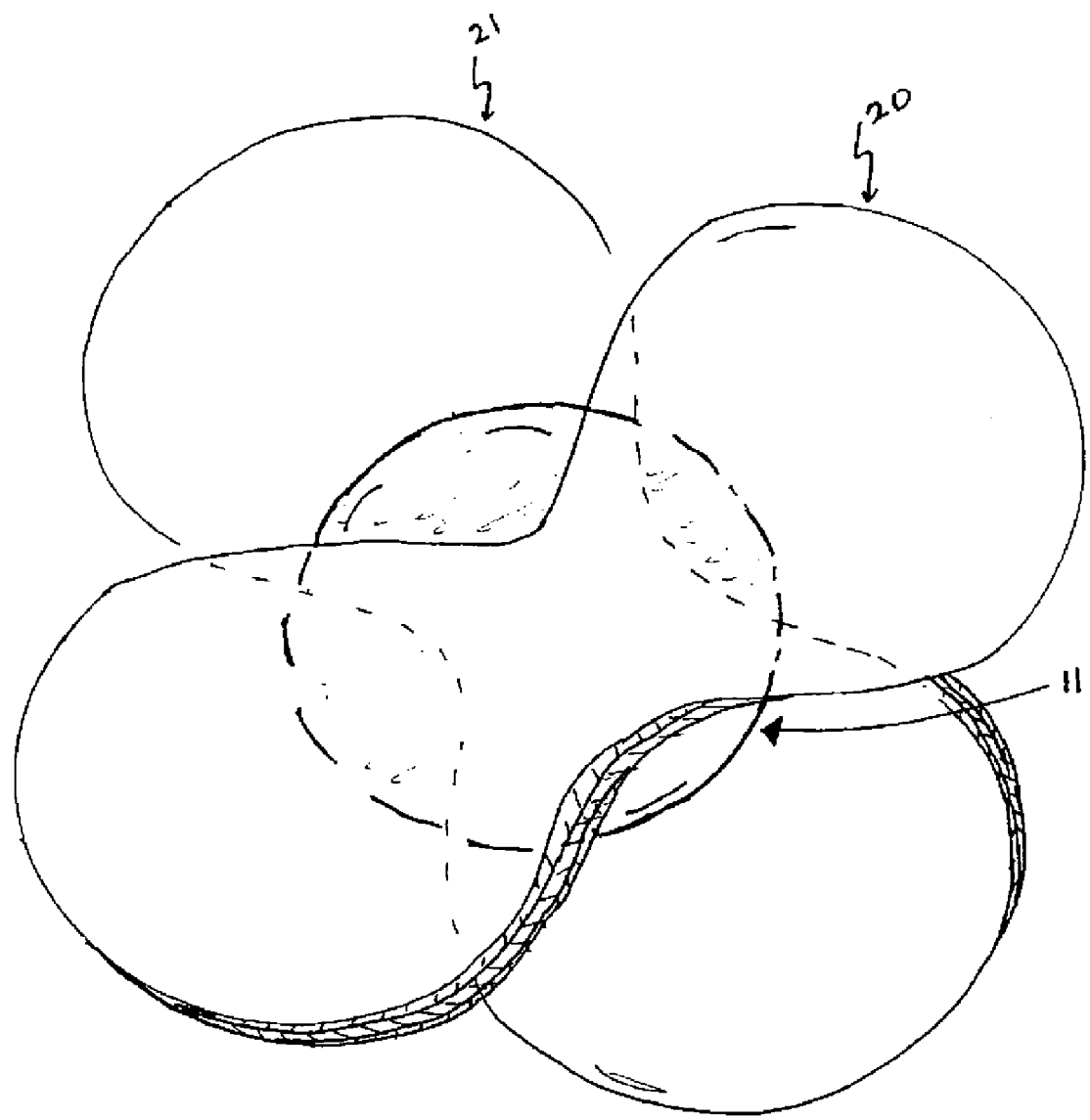
FIG. 5 is a sectional view of a mold forming multiple layers about a core center according to the invention with the mold-forming sheets being vacuum formed within the mold.

In one embodiment, the laminates 20, 21 are cut into patterns that, when joined, form a laminated layer around the center 11. For example, as illustrated in FIG. 5, the laminates 20, 21 may be cut into figure 8-shaped or barbell-like patterns, similar to a baseball or a tennis ball cover. Other patterns, such as curved triangles, hemispherical cups, ovals, or any like patterns that may be joined together to form a laminated layer around the center 11 may also be used. The patterns may then be placed in between molds 36, 37 and formed to the cavities in the mold halves 39.

In one embodiment, the laminates are suction formed to the cavities by using a vacuum source 40. The vacuum source 40 suction forms the laminates 20, 21 to the half mold cavities 39 so that uniformity in layer thickness is maintained.

Figure 6:
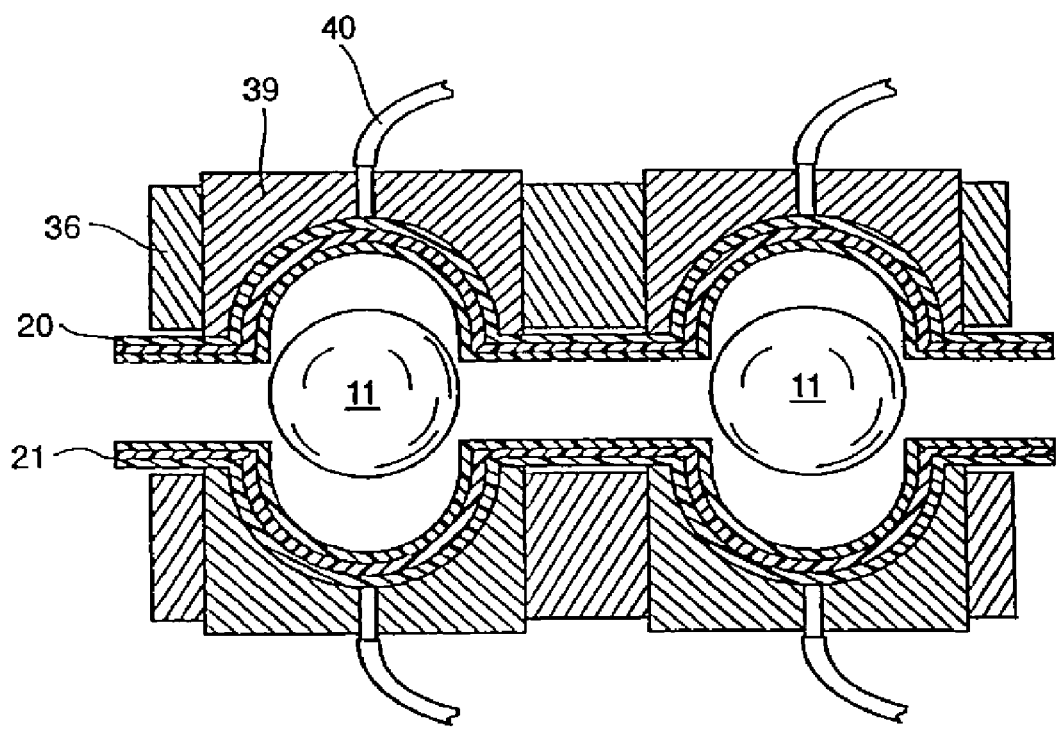
FIG. 6 is a sectional view of a mold forming multiple layers about a core center according to the invention with the mold-forming sheets being vacuum formed within the mold.

After the laminates 20, 21 have been formed to the cavities, centers 11 are then inserted between the laminates, as shown in FIG. 6. The laminates 20, 21 are then compression molded about the center 11 under conditions of temperature and pressure that are well known in the art.

Figure 7:
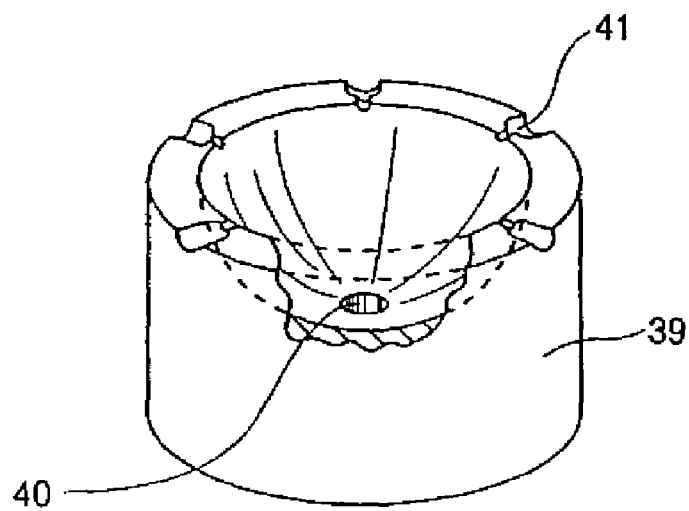
FIG. 7 is a perspective view of a half mold for use in forming multiple layers about core centers according to the present invention.
Figure 8:
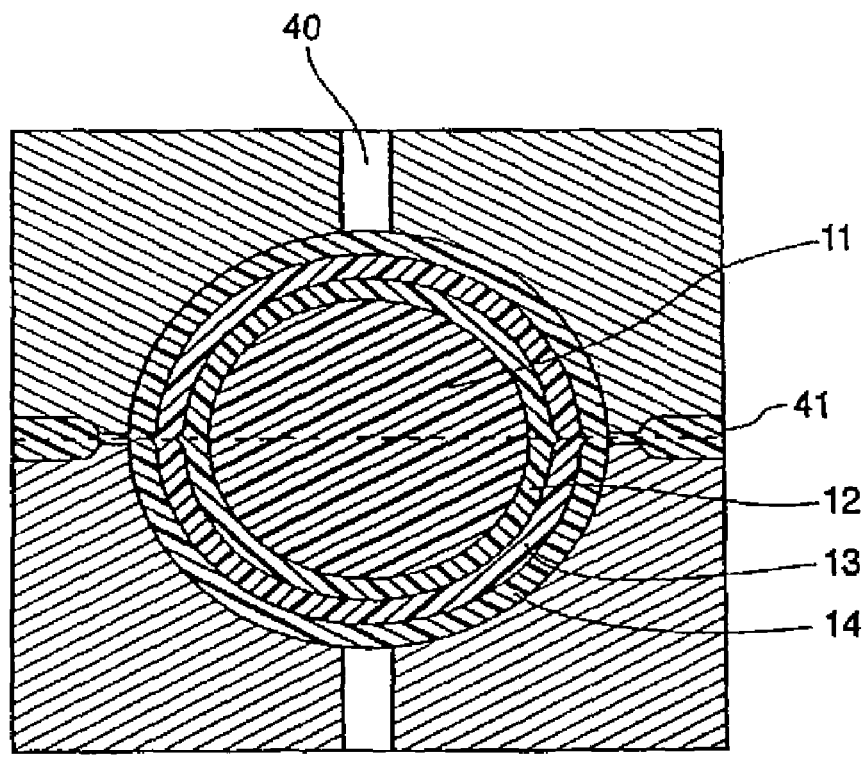
FIG. 8 is a cross-sectional view of a compression mold of a golf ball core according to the present invention.

The half molds 39 have a plurality of vents 41, as shown in FIGS. 7 and 8. The compression molding step includes flowing excess layer material from the laminates 20, 21 through at least three vents 41 so that the flow of laminate material is symmetrical about the center 11 and so that the center 11 does not shift due to lateral flow patterns. In a preferred embodiment, the half molds 39 have 4 to 6 vents.

Figure 9:
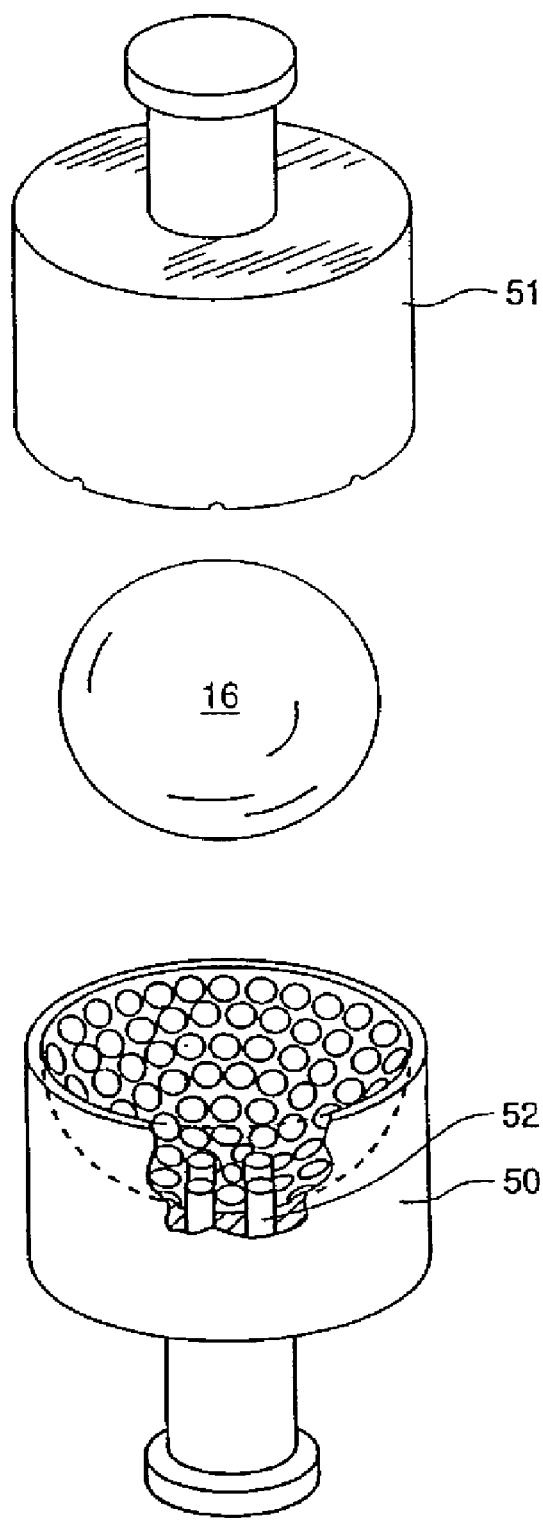
FIG. 9 is an exploded view of a golf ball core according to the present invention in a retractable-pin injection mold.

The next step in the present invention is to form a cover 15 around the golf ball core 16, i.e., the inner components of the golf ball. The core 16, including center 11 and layers 12, 13, 14, is supported within a pair of cover mold-halves 50, 51 by a plurality of retractable pins 52, as shown in FIG. 9. The retractable pins 52 are actuated by conventional means known to those of ordinary skill in the art of mold design.

Figure 10:
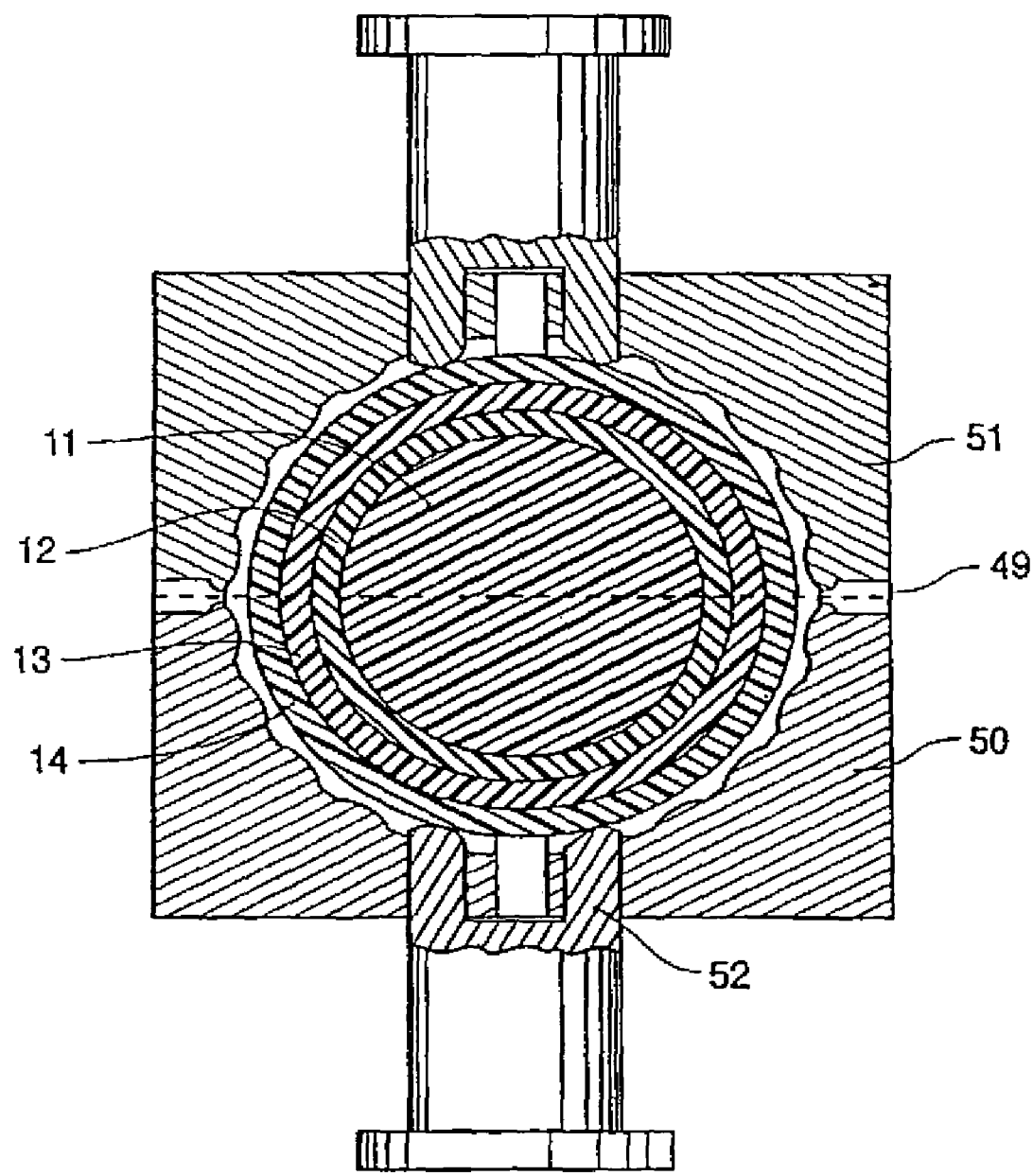
FIG. 10 is a cross-sectional view of a golf ball core according to the present invention in a retractable-pin injection mold.

After the mold-halves 50, 51 are closed together with the pins 52 supporting the core 16, the cover material is injected into the mold in a liquid state through a plurality of injection ports or gates 49, as shown in FIG. 10. Gates 49 can be edge gates or sub-gates. With edge gates, the resultant golf balls are all interconnected and may be removed from the mold-halves 50, 51 together in a large matrix. Sub-gating automatically separates the mold runner from the golf balls during the ejection of the golf balls from mold-halves 50, 51.

Figure 11:
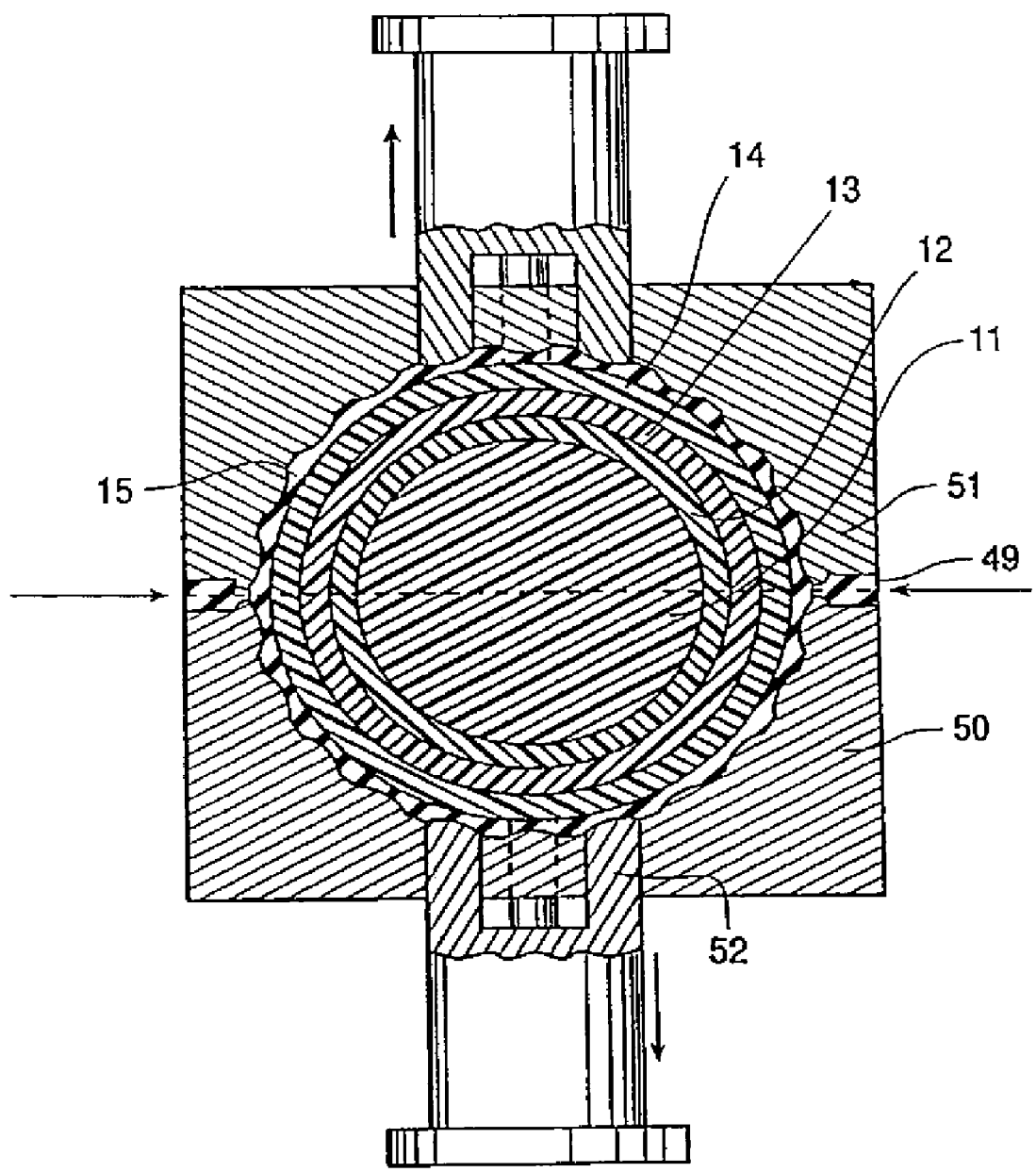
FIG. 11 is a cross-sectional view of a golf ball according to the present invention in a retractable-pin mold.

As illustrated in FIG. 11, retractable pins 52 are retracted after a predetermined amount of cover material has been injected into the mold-halves 50, 51. The predetermined amount of cover material is substantially all of the material to be injected. Thus, the core 16 is substantially surrounded by cover material and does not shift when the retractable pins 52 are removed. This allows the liquid cover material to flow and substantially fill the cavity between the core 16 and the mold-halves 50, 51. At the same time, concentricity is maintained between the core 16 and the mold-halves 50, 51.

The cover material is allowed to solidify around the core 16, thereby forming cover 15. Golf ball 10 is then ejected from mold-halves 50, 51, and finished using processes which are well known in the art. The temperatures and curing time for mold-halves 50, 51 are generally known in the art and are dependent on the material that is being used for cover 15.

Figure 12:
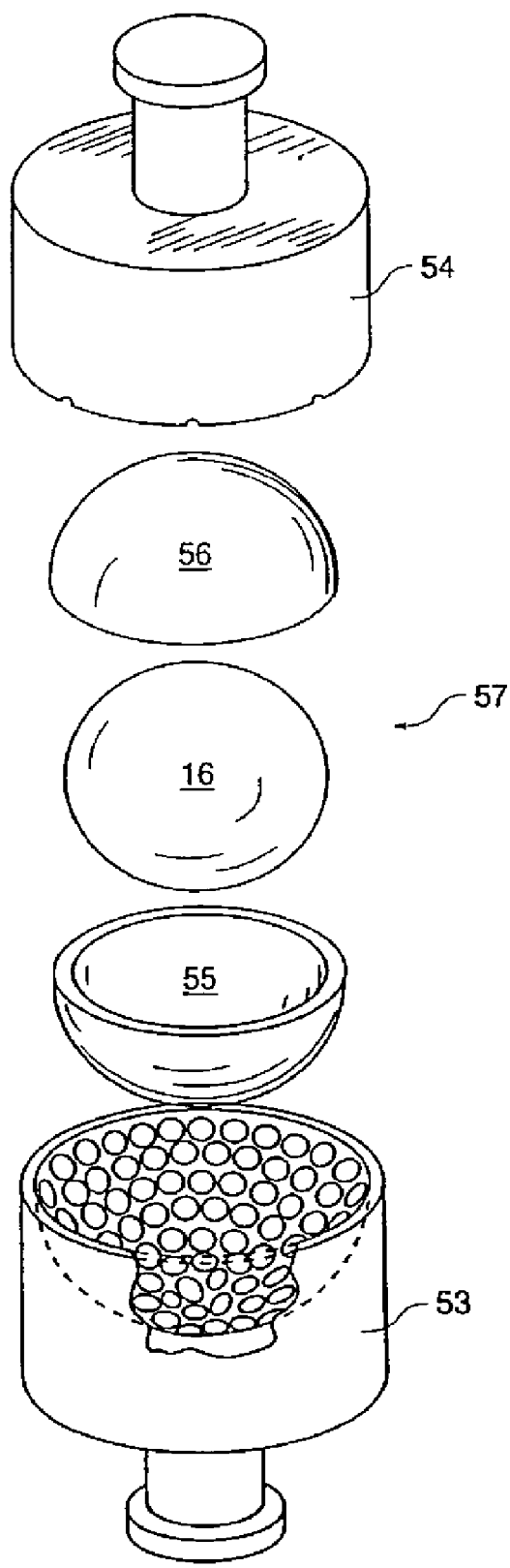
FIG. 12 is an exploded view of a golf ball core according to the present invention with cover layer hemispheres in a compression mold.

In another embodiment, shown in FIG. 12, the cover 15 is formed using cover layer hemispheres 55, 56. Two cover layer hemispheres 55, 56 are pre-formed of the desired cover material, preferably, by an injection molding process. The hemispheres 55, 56 are positioned around the core 16, thereby forming an assembly 57. Assembly 57 is placed into a compression mold 58 that includes two compression mold-halves 53, 54. Mold-halves 53, 54 are advanced toward each other until their mating surfaces touch, and the mold 58 is heated to melt the hemispheres. Mold-halves 53, 54 compress and heat the hemispheres 55, 56 about the core 16 to mold the cover material thereto.

While the embodiments above are directed to the use of laminates to form the golf balls of the present invention, the construction of the golf balls of the present invention are not limited to the embodiments described above and can be made by any conventional processes employed in the golf ball art. For example, the solid cores can be either injection or compression molded. The intermediate layer may then be subsequently injection or compression molded about the core. It is important that the intermediate layer material be able to sustain the temperatures applied during the application of the cover layer. The cover layer or layers may then be injection or compression molded or cast about the intermediate layer.

Specific Golf Ball Constructions

Various embodiments of the golf balls are outlined below. The golf balls of the invention, however, variation of these embodiments are covered as well. Properties such as hardness, Bashore resilience, flexural modulus, center diameter, and layer thickness of the golf balls of the present invention have been found to affect play characteristics such as spin, initial velocity and feel of golf balls.

In one embodiment, the center 11 and each of the layers 12, 13, 14 are formed of a thermoset rubber, such as polybutadiene rubber. In this embodiment, a golf ball core 16 has a center 11 and three layers 12, 13 and 14. The center diameter should be greater than about 1 inch and, preferably, should be about 1.25 to 1.45 inches. The most preferred center has a diameter of about 1.4 inches. Each of the layers surrounding the center should have a thickness of less than about 0.1 inches and preferably, less than about 0.05 inches. The most preferred thickness of the layers is about 0.03 to about 0.05 inches where the thickness of the third layer is equal to or less than the thickness of the first and second layers. Moreover, the center 11 of the golf ball preferably has an outer diameter of greater than 60 percent of the finished ball 10 diameter. Most preferably, the center 11 has a diameter that is at least 75 percent of the diameter of the finished ball 10.

A small center of 1 inch or less and relatively thick core layers, each having a thickness of greater than 0.1 inches, decreases ball initial velocity and reduces the ball spin rate effects. When impacting a golf ball with different clubs within a set, the impact speed and the impact angle are changed. On an average, for a tour professional the impact speed of a driver is about 110 miles an hour. The average professional 5 iron impact speed is around 90 miles an hour and the wedge impact velocity is less than about 80 miles an hour. Moreover, the force on the golf ball must be broken up into two components, the normal force that is normal to the club face and the tangential force that is parallel to the club face. Since most professionals use a driver having a loft of about 10 degrees, the tangential force is significantly less than the normal force. However, when using a wedge having a loft between 48 and 60 degrees, the tangential force becomes very significant. For example, experimental data shows that with a club head having an impact velocity of about 95 miles an hour and an angle of 20 degrees, a two piece ball has a maximum deflection of about 0.151 inches. When hit with a club head at 95 miles an hour and an impact angle of 40 degrees, the ball has a maximum deflection of about 0.128 inches or a difference of 0.023 inches. Thus, the impact deflection depends significantly on the impact angle, and by having outer layers of less than 0.1 inches, the spin characteristics of the ball is altered for different clubs within a set as discussed in more detail below.

For a high spin rate ball that also has good driver trajectory characteristics, the center 11 of the golf ball should have a Shore C hardness of about 70 or less. The first layer 12 should be harder than the center 11 and should have a Shore C hardness of about 70 to about 75. The second layer 13 should be harder than the first layer 12 and have a Shore C hardness of about 72 to about 77. The third layer or outer layer 14 should be harder than the second layer 13 and have a Shore C hardness of about 75 to about 80. The cover 15 of the first embodiment golf ball should be a soft cover and have a Shore D of less than 60. Moreover, the center 11, layers 12, 13 and 14 and the cover 15 should be configured to provide a golf ball compression of less than 85 and more preferably, less than about 80.

By creating a core 16 with relatively thin outer layers that progressively get harder, the spin rate of the ball is surprisingly good for a player that desires a high spin rate golf ball. More particularly, when this type of player hits the ball with a short iron, only the outer layer and cover affect the spin rate of the ball. By incorporating a very hard core outer layer and a soft cover, the spin rate is maximized for the short iron shot such as a wedge having an angle of about 48 to 60 degrees. In order to reduce the spin rate a little for middle iron shots such as a 6 iron having a loft of about 32 degrees to make sure that sufficient distance is obtained, the second layer is softer than the third layer. Similarly, to decrease the spin rate, provide good distance and a good trajectory for long irons such as a 3 iron having a loft of about 20 degrees, the first layer 11 is softer than the second layer 12. Finally, for a low spin rate with the driver having a loft of about 8 to 12 degrees, the center is made very soft.

Solid cores having diameters of about 1.58 inches may also be made using the compositions of the core materials outline above. Cores having the centers as defined above preferably have a compression of about 50. The first layer composition preferably has a compression of about 75. Preferably, the first layer material will have a compression that is over 25 percent greater than the center material compression. The second layer composition preferably has a compression of about 85 and, thus, has a greater compression than the first layer. The third layer composition has a compression of about 110, which is significantly greater than the second layer. Preferably, the third layer compression is more than 75 percent greater than the center material compression.

In a preferred embodiment, the cover material includes a blend of two materials, a very soft material and a harder material. Preferably, the cover includes about 75 to about 25 parts by weight based on 100 parts by weight resin (phr) of a low flexural modulus ionomer resin; and about 25 to about 75 pph of a standard ionomer resin. The low flexural modulus ionomer is preferably a sodium ionomer resin and constitutes about 40 pph to about 60 pph of the ionomer blend and the standard flexural ionomer is a lithium ionomer resin and constitutes about 60 pph to about 40 pph of the ionomer blend. The sodium ionomer resin is preferably a copolymer including about 95 to about 80 parts by weight of copolymer of ethylene and about 5 to about 12 parts by weight of the copolymer of acrylic or methacrylic acid in which about 10% to about 90% of the acid groups are neutralized by sodium. Preferably, lithium ionomer resin is a copolymer including about 95 to about 80 parts by weight of ethylene and about 10 to about 16 parts by weight of acrylic or methacrylic acid based on 100 party by weight copolymer. Preferably, the lithium ionomer resin has about 10 percent to about 90 percent of the acid groups neutralized by lithium.

Preferably, the low flexural modulus sodium ionomer resin used in this embodiment has a flexural modulus between about 1,000 psi and about 20,000 psi (5 MPa and 140 MPa) and, more preferably, between about 2,000 psi and about 10,000 psi (10 MPa to 70 Mpa). The lithium ionomer resin preferably has a high flexural modulus which is above about 60,000 psi (415 MPa). More preferably, the lithium ionomer resin used in the present invention has a flexural modulus between about 60,000 and about 80,000 psi (415 and 550 MPa). Good results have been obtained with the lithium ionomer resins having flexural moduli in the range of about 60,000 psi to about 70,000 psi (415 to 485 MPa).

In this embodiment, both the lithium and sodium ionomer resins preferably have about 10 percent to about 90 percent of their carboxylic acid groups neutralized by their respective metal ions. More preferably, both the lithium and sodium ionomer resins have their carboxylic acid groups neutralized about 35% to about 65% by the metal ion.

In addition, the ionomer resins preferably include the same monocarboxylic acid, e.g. either methacrylic or acrylic acid.

In one embodiment, 55 weight percent SURLYN® 8320 and 45 weight percent SURLYN®7940 are included in the cover blend, wherein the blend has a hardness of 55 Shore D. In another embodiment, 45 weight percent SURLYN® 8320 and 55 weight percent SURLYN® 7940 are included in the cover blend with a hardness of 59 Shore D.

In a second embodiment, the center 11 and each of the layers 12, 13, 14 also include a thermoset rubber, such as polybutadiene.

In this second embodiment, the golf ball core also has a center 11 and three layers 12, 13, 14. The center 11 should be greater than 1.0 inch and, preferably, about 1.25 to 1.45 inches in diameter. The most preferred center has a diameter of about 1.4 inches. Each of the layers should have a thickness of less than about 0.1 inches and preferably, less than about 0.05 inches. The most preferred thickness of each of the layers is about 0.03 inches. Again, by having outer layers of less than 0.1 inches, the spin characteristics of the ball can be altered for different clubs within a set.

The center 11 of the second embodiment golf ball should have a Shore C hardness of greater than about 75 for low swing speed players. The first layer should be softer than the center and have a Shore C hardness of about 75 to 72. The second layer should be softer than the first layer and have a Shore C hardness of about 73 to 70. The third layer should be the softest and have a Shore C hardness of less than about 70. The cover of the second embodiment golf ball should have good resilience and durability. Preferably, the cover of the second embodiment is a harder cover and includes a blend of about 50/50 by weight of two standard or high acid ionomers. Standard ionomers have about 15 parts by weight of acrylic or methacrylic acid. High acid ionomers have about 17 or more parts by weight of acrylic or methacrylic acid.

By creating a golf ball core 16 with relatively thin outer layers that progressively get softer, the feel and distance is optimized for a low swing speed player. More particularly, when the low swing speed player hits the ball with a short iron, only the outer or third layer and cover are compressed. By utilizing a soft core and a harder cover, the feel of the ball is relatively soft when compared to distance balls having hard covers and hard cores. In order to increase the distance for middle irons while still providing a relatively soft feel, the second layer is made harder than the third layer. Similarly, to provide greater resiliency for long irons, the first layer II is harder than the second layer. Finally, for maximum resiliency with the driver, the center is made harder than each of the layers. Since the center 11 is large, i.e., between about 1.25 and 1.45 inches in diameter, the ball has a high compression and initial velocity. However, since the third layer is soft, the ball provides a surprisingly better feel than hard core/hard cover balls.

Preferably, the cover material of this embodiment should provide good resiliency and durability. In one embodiment, the cover material includes of a blend of two ionomer resins having relatively the same flexural moduli, e.g., sodium ionomer resin and lithium ionomer resin.

Preferably, the sodium ionomer resin is a copolymer including about 95 to about 80 parts by weight of copolymer of ethylene and about 12 to about 20 parts by weight of the copolymer of acrylic or methacrylic acid in which about 10 percent to about 90 percent of the acid groups are neutralized by sodium.

The lithium ionomer resin is preferably a copolymer including about 95 to about 80 parts by weight of ethylene and about 12 to about 20 parts by weight of acrylic or methacrylic acid based on 100 parts by weight copolymer. Preferably, the lithium ionomer resin has about 10 percent to about 90 percent of the acid groups neutralized by lithium.

Preferably, the sodium ionomer resin used according to this embodiment preferably has a flexural modulus between about 60,000 and about 80,000 psi (415 and 550 Mpa). The lithium ionomer resin used according to this embodiment preferably has a flexural modulus between about 60,000 and about 80,000 psi (415 and 550 MPa). Good results have been obtained with the sodium and lithium ionomer resins having flexural moduli in the range of about 60,000 psi to about 70,000 psi (415 to 485 MPa).

Preferably, the ionomer resins incorporate the same monocarboxylic acid, e.g., either methacrylic or acrylic acid.

Sodium ionomer resin sold by DuPont under the name SURLYN® 8920 has worked well in the present invention. Good results have also been obtained with a lithium ionomer resin sold under the trade name SURLYN® 7940 by DuPont.

The golf ball of the present invention can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

EXAMPLES

Example 1

Table 1 sets forth an example of the core contents, i.e., center and inner layers, according to one embodiment of the invention. The fillers used in the compositions of these examples are regrind and barium sulfate ($BaSO_4$). Vulcup 40KE® and Varox 231XL® are free radical initiators, and are a-a bis(t-butylperoxy)diisopropylbenzene and 1,1-di(t-butylperoxy) 3,3,5-trimethyl cyclohexane, respectively.

TABLE 1

Core Compositions (pph, based on 100 parts of polybutadiene)

| | Layer No. | | | |
|---|---|---|---|---|
| | Center | 1 | 2 | 3 |
| Polybutadiene | 100 | 100 | 100 | 100 |
| Polywate 325 | 26 | 23 | 18 | 13 |
| Vulcup 40KE ® | 0.3 | 0.3 | 0.3 | 0.3 |
| Varox 231XL ® | 0.6 | 0.5 | 0.5 | 0.5 |
| $BaSO_4$ | 31 | 26 | 25 | 25 |
| Zinc Diacrylate | 30 | 32 | 35 | 47 |
| SR-350 | 2 | 2 | 2 | 6 |
| Calcium Oxide | 3 | 0 | 0 | 0 |
| Zinc Oxide | 0 | 3 | 6 | 6 |

The center 11 set forth in Table 1, has a Shore C hardness of about 65 at the center point thereof and a Shore C hardness of about 68 at the midpoint between the center and the outer edge. The first layer 12 is harder than the center 11 and has a Shore C hardness of about 71. The second layer 13 is harder than the first layer 12 and has a Shore C hardness of about 73. The third layer or outer layer 14 is harder than the second layer 13 and had a Shore C hardness of about 77. The cover 15 of the first embodiment golf ball is a soft cover and includes a blend of about 50/50 by weight of very low flexural modulus ionomer and a standard ionomer. The golf ball preferably has a compression of about 60.

The center 11 of the core 16 was compression molded to a diameter of about 1.39 inches and each of the three layers, 12, 13 and 14 had a thickness of about 0.03 inches. Solid cores having diameters of about 1.58 inches were made using the compositions of the core materials of Table 1.

Cores having the center composition of Table 1 have a compression of about 50. The first layer composition has a compression of about 75. The first layer material has a compression that is over 25 percent greater than the center material compression. The second layer composition has a compression of about 85 and, thus, has a greater compression than the first layer. The third layer composition has a compression of about 110, which is significantly greater than the second layer. The third layer compression is more than 75 percent greater than the center material compression.

All the ingredients except the peroxides were mixed in a Process Lab Brabender mixer to about 180-200° F. The peroxides were added in the second stage to the initial mixture, and the resulting mixture was removed from the Brabender and blended on a lab mill to insure homogeneity. After mixing, the mixture was then hand rolled using a laboratory mill and cut into pieces or "preps". To make the centers 11, the preps were then compression molded at about 160° C. (320° F.) for about 15 minutes. To fabricate the outer layers, the polybutadiene rubber material was rolled into flat sheets and the sheets were stacked to form a laminate. The laminate was then compression molded around the centers as described above. To form the finished golf balls, the cores were ground and inserted into two cover hemispheres of lithium-sodium blends of SURLYN®.

The cover blends used in this example are set forth in Table 2.

TABLE 2

Cover Compositions (pph)

| | Example No. | |
|---|---|---|
| | 1 | 2 |
| SURLYN 8320 | 55% | 45% |
| SURLYN 7940 | 45% | 55% |
| Blend Hardness (Shore D) | 55 | 59 |

Example 2

The center of the second embodiment, as set forth in Table 3, has a Shore C hardness of about 77. The first layer is softer than the center and has a Shore C hardness of about 73. The second layer is softer than the first layer and has a Shore C hardness of about 71. The third layer is softer than the second layer and has a Shore C hardness of about 68. The cover of the second embodiment golf ball is a harder cover than that used with the first embodiment and includes a blend of about 50/50 by weight of a standard sodium ionomer and a standard lithium ionomer. The cover, as described in Table 4, has a Shore D hardness of about 65 to 70.

Table 3 sets forth the contents of the golf ball core in the second embodiment. The compositions used to prepare the golf ball core of this embodiment are all in parts per hundred (pph), based on 100 parts of polybutadiene.

In the second embodiment, the center 11 of the core 16 was compression molded to a diameter of about 1.39 inches and each of the three layers, 12, 13 and 14 had a thickness of about 0.03 inches.

TABLE 3

Inner Ball Compositions
(pph, based on 100 parts of polybutadiene)

| | Layer No. | | | |
|---|---|---|---|---|
| | Center | 1 | 2 | 3 |
| Polybutadiene | 100 | 100 | 100 | 100 |
| Polywate 325 | 13 | 18 | 23 | 26 |
| Vulcup 40KE ® | 0.3 | 0.3 | 0.3 | 0.3 |
| Varox 231XL ® | 0.5 | 0.5 | 0.5 | 0.6 |
| BaSO$_4$ | 25 | 25 | 26 | 31 |
| Zinc Diacrylate | 47 | 35 | 32 | 30 |
| SR-350 | 6 | 2 | 2 | 2 |
| Calcium Oxide | 0 | 0 | 0 | 3 |
| Zinc Oxide | 6 | 6 | 3 | 0 |

To make the core centers 11, preps were made and compression molded. To fabricate the outer layers, the polybutadiene rubber material was rolled into flat sheets and stacked into a laminate. The laminate was then compression molded around the centers as described above. To form the finished golf balls, the cores were ground and inserted into two cover hemispheres of standard lithium-sodium blends of SURLYN®.

Example 3

Table 4 below provides batch compositions for intermediate layer blends for forming the novel multilayer golf balls of the present invention. However, it is to be understood that the examples are only for illustrative purposes and in no manner is the present invention limited to the specific disclosures therein.

In particular, batch numbers 2-4 provide intermediate layer blends including NUCREL® 960, HYTREL® 3078, and ZnO used to form the intermediate layers of the golf balls of the present invention. Batch number 1 provides a control intermediate layer blend.

TABLE 4

Intermediate Layer Formulations

| Batch # | % NUCREL ® 960 | % HYTREL ® 3078 | % ZnO | Flexural Modulus (psi) | Specific Gravity |
|---|---|---|---|---|---|
| 1 | — | 80 | 20 | 4210 | 1.27 |
| 2 | 10 | 75 | 15 | 5560 | 1.21 |
| 3 | 20 | 70 | 10 | 7710 | 1.17 |
| 4 | 30 | 65 | 5 | 7250 | 1.14 |

Example 4

Multilayer golf balls were made having intermediate layers formed from the batch compositions set forth in Table 4. Several dozen golf balls were formed using each batch composition and subsequently tested for compression, spin rate and initial velocity.

The cores of all of the multilayer balls were formed by compression molding a blend of the batch formulation set forth in Table 5 below. All of the cores had a diameter of 1.39 inches and were measured to have compressions ranging from about 45 to about 55 and specific gravities of from about 1.134 to about 1.146.

The intermediate layer blends of Table 4 were subsequently injection molded about the cores to form the intermediate layers of the balls having an outer diameter of about 1.51 inches.

TABLE 5

Core Formulation

| Material | Parts Per Hundred |
|---|---|
| Polybutadiene (Shell 1220) | 76.0 |
| Rubber (Enichem Br40) | 24.0 |
| Pigment | 0.10 |
| Zinc Diacrylate | 24.79 |
| Calcium Oxide | 2.16 |
| Regrind | 6.47 |
| Peroxide (VAROX ®) | 0.43 |
| Peroxide (EF-60) (DBDB) | 0.16 |
| Filler | 22.64 |
| Process Oil | 1.50 |

All of the multilayer balls had a cover composition formed by injection molding a blend including 50 percent SURLYN® 7940 and 50 percent SURLYN® 8140 about the intermediate layers and were subsequently finished using conventional clear coating and buffing techniques. The finished golf balls had an outer diameter of about 1.68 inches. These balls were tested for initial velocity, compression cover hardness and COR, the results of such tests are set forth in Table III below.

The balls were also tested for spin rate using a True Temper Test Machine configured to strike the balls with a driver and an 8-Iron. Also tested for comparison purposes were conventional two piece "distance" balls (Titleist® HP2 Distance and Pinnacle® Gold). The test data for all of these balls is set forth in Tables 6-8 below.

TABLE 6

| Ball | Velocity[1] (ft/s) | Compression[1] (Ball) | Weight[1] (oz) | Cover[2] Hardness (Shore D) | COR[3] (at 125 ft/s) |
|---|---|---|---|---|---|
| Pinnacle ® Gold[4] | 252.5 | 95 | 1.605 | 68 | 0.809 |
| Titleist ® HP2 Distance[4] | 253.0 | 99 | 1.600 | 71 | 0.810 |
| Ball 1 | 251.9 | 81 | 1.610 | 71 | 0.814 |
| Ball 2 | 252.3 | 84 | 1.584 | 72 | 0.814 |
| Ball 3 | 252.2 | 84 | 1.588 | 71 | 0.813 |
| Ball 4 | 251.9 | 84 | 1.590 | 69 | 0.810 |

[1]Average based on results for 12 balls
[2]Average based on results for 3 balls
[3]Average based on results for 6 balls
[4]Historical data for commercial balls

TABLE 7

Spin Rates For Driver

| Ball Type | Launch Angle (°) | Spin (rpm) | Club Speed (ft/s) |
|---|---|---|---|
| Pinnacle ® Gold | 9.1 ± 0.3 | 3032 ± 135 | 158.6 ± 0.6 |
| Titleist ® HP2 Distance | 9.0 ± 0.3 | 2977 ± 60 | 158.6 ± 1.0 |
| Ball 1 | 9.1 ± 0.5 | 2973 ± 195 | 158.4 ± 0.6 |
| Ball 2 | 9.1 ± 0.5 | 3001 ± 66 | 158.9 ± 0.7 |
| Ball 3 | 9.1 ± 0.4 | 3006 ± 121 | 158.9 ± 0.8 |
| Ball 4 | 9.0 ± 0.3 | 3007 ± 140 | 159.0 ± 0.6 |

TABLE 8

Spin Rate For 8-Iron

| Ball Type | Launch Angle (°) | Spin (rpm) | Club Speed (ft/s) |
|---|---|---|---|
| Pinnacle ® Gold | 19.2 ± 0.4 | 8160 ± 218 | 116.4 ± 0.1 |
| Titleist ® HP2 Distance | 19.4 ± 0.5 | 8375 ± 171 | 116.3 ± 1.3 |
| Ball 1 | 19.2 ± 0.5 | 7970 ± 246 | 116.2 ± 0.7 |
| Ball 3 | 19.3 ± 0.2 | 7972 ± 168 | 116.5 ± 0.9 |
| Ball 4 | 19.4 ± 0.3 | 7940 ± 171 | 117.0 ± 1.3 |

As shown by results reported in Tables 6-8, golf balls having an intermediate layer including NUCREL® 960, HYTREL® 3078, and ZnO have a high initial velocity and low spin rate. Moreover, the balls of the present invention have initial velocities approaching those of conventional two-piece "distance" balls, but have a considerably lower compression, which provides a much softer feel, more like a wound ball. Still further, these balls are easy to manufacture compared to the conventional wound ball. Thus, these balls provide the advantages of two piece "distance" balls with low spin rates and high velocity, but also provide a softer feel than such balls.

Example 5

Multilayer golf balls were made having intermediate layers formed from a blend including 20 percent NUCREL® 960, 57 percent HYTREL® 3078, and 23 percent ZnO. This intermediate layer blend was injection molded about cores formed from the batch formulation set forth in Table 5. A cover was formed by injection molding a blend of 50 percent SURLYN® 7940, 47 percent SURLYN® 8940, and 3 percent SURLYN® 8660 around the intermediate layer and subsequently finishing the balls using conventional clear coating and buffing techniques.

The balls were tested for initial velocity, compression, cover hardness and COR, as well as for spin rate when struck by a driver and an 8-Iron using a True Temper Test Machine. The results of such tests are set forth below in Tables 9-11 below.

TABLE 9

| Velocity[1] (ft/s) | Compression[1] (Ball) | Weight[1] (oz) | Cover Hardness[2] (Shore D) | COR[3] (at 125 ft/s) | Specific Gravity |
|---|---|---|---|---|---|
| 251.5 | 82 | 1.607 | 69 | 0.801 | 1.27 |

[1]Average based on results for 12 balls
[2]Average based on results for 3 balls
[3]Average based on results for 6 balls

TABLE 10

| Club | Launch Angle (°) | Spin (rpm) | Club Speed (ft/s) |
|---|---|---|---|
| Driver | 9.2 ± 0.5 | 3015 ± 221 | 160.3 ± 0.7 |
| 8 Iron | 19.3 ± 0.6 | 7807 ± 252 | 115.6 ± 0.8 |

TABLE 11

Mantle Layer Compositions and Properties

| | Sample | Hardness (Shore D) | Resilience (%) | Flex Modulus (psi) | Tensile Modulus (psi) | % Strain at Break |
|---|---|---|---|---|---|---|
| 1A | 0% Estane 58091 100% Estane 58861 | 28 | 54 | 1,720 | 756 | 563 |
| 1B | 25% Estane 58091 75% Estane 58861 | 34 | 41 | 2,610 | 2,438 | 626 |
| 1C | 50% Estane 58091 50% Estane 58861 | 44 | 31 | 10,360 | 10,824 | 339 |
| 1D | 75% Estane 58091 25% Estane 58861 | 61 | 34 | 43,030 | 69,918 | 149 |
| 1E | 100% Estane 58091 0% Estane 58861 | 78 | 46 | 147,240 | 211,288 | 10 |
| 2A | 0% Hytrel 5556 100% Hytrel 4078 | 40 | 47 | 8,500 | 7,071 | 527 |
| 2B | 25% Hytrel 5556 75% Hytrel 4078 | 43 | 51 | 10,020 | 9,726 | 441 |

TABLE 11-continued

Mantle Layer Compositions and Properties

| Sample | | Hardness (Shore D) | Resilience (%) | Flex Modulus (psi) | Tensile Modulus (psi) | % Strain at Break |
|---|---|---|---|---|---|---|
| 2C | 50% Hytrel 5556<br>50% Hytrel 4078 | 45 | 47 | 12,280 | 10,741 | 399 |
| 2D | 75% Hytrel 5556<br>25% Hytrel 4078 | 48 | 53 | 13,680 | 13,164 | 374 |
| 2E | 100% Hytrel 5556<br>0% Hytrel 4078 | 48 | 52 | 12,110 | 15,231 | 347 |
| 3A | 0% Hytrel 5556<br>100% Hytrel 3078 | 30 | 62 | 3,240 | 2,078 | 810<br>no break |
| 3B | 25% Hytrel 5556<br>75% Hytrel 3078 | 37 | 59 | 8,170 | 5,122 | 685 |
| 3C | 50% Hytrel 5556<br>50% Hytrel 3078 | 44 | 55 | 15,320 | 10,879 | 590 |
| 3D | 75% Hytrel 5556<br>25% Hytrel 3078 | 53 | 50 | 19,870 | 16,612 | 580 |
| 3E | 100% Hytrel 5556<br>0% Hytrel 3078 | 58 | 50 | 24,840 | 17,531 | 575 |
| 4A | 0% Hytrel 4078<br>100% Pebax 4033 | 46 | 51 | 11,150 | 8,061 | 597 |
| 4B | 25% Hytrel 4078<br>75% Pebax 4033 | 46 | 53 | 10,630 | 7,769 | 644 |
| 4C | 50% Hytrel 4078<br>50% Pebax 4033 | 45 | 52 | 9,780 | 8,117 | 564 |
| 4D | 75% Hytrel 4078<br>25% Pebax 4033 | 42 | 53 | 9,310 | 7,996 | 660 |
| 4E | 100% Hytrel 4078<br>0% Pebax 4033 | 40 | 51 | 9,250 | 6,383 | 531 |
| 5A | 0% Hytrel 3078<br>100% Estane 58091 | 77 | 50 | 156,070 | 182,869 | 9 |
| 5B | 25% Hytrel 3078<br>75% Estane 58091 | 65 | 48 | 87,680 | 96,543 | 33 |
| 5C | 50% Hytrel 3078<br>50% Estane 58091 | 52 | 49 | 53,940 | 48,941 | 102 |
| 5D | 75% Hytrel 3078<br>25% Estane 58091 | 35 | 54 | 12,040 | 6,071 | 852 |
| 5E | 100% Hytrel 3078<br>0% Estane 58091 | 29 | 50 | 3,240 | 2,078 | 810<br>no break |
| 6A | 100% Kraton 1921<br>0% Estane 58091<br>0% Surlyn 7940 | 29 | 59 | 24,300 | 29,331 | 515 |
| 6B | 50% Kraton 1921<br>50% Estane 58091<br>0% Surlyn 7940 | 57 | 49 | 56,580 | — | 145 |
| 6C | 50% Kraton 1921<br>0% Estane 58091<br>50% Surlyn 7940 | 56 | 55 | 28,290 | 28,760 | 295 |
| 7A | 33.3% Pebax 4033<br>33.3% Estane 58091<br>33.3% Hytrel 3078 | 48 | 50 | 41,240 | 30,032 | 294 |
| 7B | 30% Pebax 4033<br>40% Estane 58091<br>10% Hytrel 3078 | 48 | 50 | 30,650 | 14,220 | 566 |
| 7C | 20% Pebax 4033<br>40% Estane 58091<br>40% Hytrel 3078 | 41 | 54 | 24,020 | 16,630 | 512 |

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A golf ball comprising:
a center;
a cover comprising a castable reactive liquid material; and
a laminate, wherein the laminate comprises:
a plurality of layers comprising at least a first layer adjacent the center, a second layer comprising a first thermoset material, and a third layer disposed between the first and second layers formed from a material selected from the group consisting of an ethylene methacrylic acid/acrylic acid copolymer, a second thermoset material, or a mixture thereof.

2. The golf ball of claim 1, wherein the center has a center hardness, the first layer has a first hardness greater than the center hardness, the second layer has a second hardness, and the third layer has a third hardness greater than the first hardness.

3. The golf ball of claim 1, wherein the first layer has a first hardness of 70 Shore C to 75 Shore C, the second layer has a second hardness of 75 Shore C to 80 Shore C, and the third layer has a third hardness of 72 Shore C to 77 Shore C.

4. The golf ball of claim 1, wherein the center has a center hardness, the first layer has a first hardness, and the second layer has a second hardness, and wherein the first hardness is less than the center hardness.

5. The golf ball of claim 4, wherein the third layer has a third hardness less than the first hardness.

6. The golf ball of claim 1, wherein the first thermoset material comprises polybutadiene.

7. The golf ball of claim 1, wherein the cover is formed of a composition comprising at least one castable reactive liquid material.

8. The golf ball of claim 7, wherein the at least one castable reactive liquid material comprises cast polyurethane.

9. The golf ball of claim 1, wherein the thickness of each of the layers of the laminate is less than 0.05 inches.

10. A golf ball comprising:
a center having a center hardness;
a cover cast from polyurethane; and
a laminate, wherein the laminate comprises:
a plurality of layers comprising a first layer adjacent the center having a first hardness, a second layer having a second hardness and comprising at least one thermoset material, and a third layer having a third hardness and disposed between the first and second layers, wherein the third layer consists essentially of a material having the following structure:

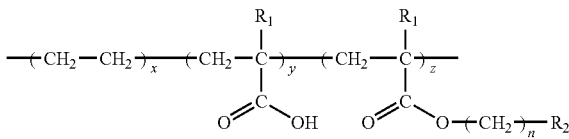

wherein x is from 50 to 99 percent, y is from 1 to 50 percent, z is from 0 to 49 percent, $R_1$ comprises H or $CH_3$, $R_2$ comprises $CH_3$ or isobornyl, and n is from 0 to 12.

11. The golf ball of claim 10, wherein the first hardness is greater than the center hardness and the third hardness is greater than the first hardness.

12. The golf ball of claim 10, wherein the first hardness is less than the center hardness and the third hardness is less than the first hardness.

13. The golf ball of claim 10, wherein the material of the third layer is selected from the group consisting of ethylene/acrylic acid; ethylene/methacrylic acid; ethylene/acrylic acid/n- or isobutyl acrylate; ethylene/methacrylic acid/n- or iso-butyl acrylate; ethylene/acrylic acid/methyl acrylate; ethylene/methacrylic acid/methyl acrylate; ethylene/acrylic acid/iso-bornyl acrylate or methacrylate and ethylene/methacrylic acid/isobornyl acrylate or methacrylate.

14. The golf ball of claim 10, wherein the thermoset material comprises polybutadiene.

15. The golf ball of claim 10, wherein the thickness of each of the layers of the laminate is less than 0.05 inches.

16. A golf ball comprising:
a center;
a cover comprising a castable reactive liquid material; and
a laminate disposed between the center and the cover, wherein the laminate comprises:
a plurality of layers comprising at least a first layer adjacent the center, a second layer comprising a high acid ionomer, and a third layer disposed between the first and second layers formed from a blend of an ethylene methacrylic acid/acrylic acid copolymer and a thermoplastic material.

17. The golf ball of claim 16, wherein the thermoplastic material comprises polyesterester block copolymers, polyetherester block copolymers, polyetheramide block copolymers, ionomer resins, dynamically vulcanized thermoplastic elastomers, styrene-butadiene elastomers with functional groups, thermoplastic polyurethanes, thermoplastic polyesters, metallocene polymers, or mixtures thereof.

18. The golf ball of claim 16, wherein the blend comprises 10 to 50 percent by weight ethylene methacrylic/acrylic acid copolymer, 25 to 75 percent by weight of the thermoplastic material and 5 to 40 percent by weight zinc oxide.

19. The golf ball of claim 18, wherein the blend comprises 15 to 25 percent by weight ethylene methacrylic/acrylic acid copolymer, 50 to 60 percent by weight of the thermoplastic material and 20 to 30 percent by weight zinc oxide.

20. The golf ball of claim 16, wherein the thickness of each of the layers of the laminate is less than 0.05 inches.

* * * * *